US012661846B2

(12) United States Patent
Rumbak et al.

(10) Patent No.: US 12,661,846 B2
(45) Date of Patent: Jun. 23, 2026

(54) METHOD AND SYSTEM FOR ADDITIVE MANUFACTURING OF PEELABLE SACRIFICIAL STRUCTURE

(71) Applicant: Stratasys Ltd., Rehovot (IL)

(72) Inventors: Mayan Rumbak, Mazkeret Batia (IL); Eduardo Napadensky, Natania (IL); Gavish Mida, Kibbutz Lehavot Haviva (IL)

(73) Assignee: Stratasys Ltd., Rehovot (IL)

(*) Notice: Subject to any disclaimer, the term of this patent is extended or adjusted under 35 U.S.C. 154(b) by 0 days.

(21) Appl. No.: 18/411,076

(22) Filed: Jan. 12, 2024

(65) Prior Publication Data

US 2024/0149521 A1 May 9, 2024

Related U.S. Application Data

(60) Division of application No. 16/914,392, filed on Jun. 28, 2020, now Pat. No. 11,897,187, which is a (Continued)

(51) Int. Cl.
*B29C 64/112* (2017.01)
*B29C 64/209* (2017.01)
(Continued)

(52) U.S. Cl.
CPC .......... *B29C 64/112* (2017.08); *B29C 64/209* (2017.08); *B29C 64/40* (2017.08); (Continued)

(58) Field of Classification Search
CPC ........................................................ B29C 64/00
See application file for complete search history.

(56) References Cited

U.S. PATENT DOCUMENTS 5,503,785 A 4/1996 Crump et al.
6,228,923 B1 5/2001 Lombardi et al.
(Continued)

FOREIGN PATENT DOCUMENTS

CN 1544231 11/2004
CN 1665877 9/2005
(Continued)

OTHER PUBLICATIONS

Communication Pursuant to Article 94(3) EPC Dated Apr. 5, 2022 From the European Patent Office Re. Application No. 18819471.6. (3 Pages).

(Continued)

*Primary Examiner* — Galen H Hauth

(57) ABSTRACT

A method of additive manufacturing of a three-dimensional object includes sequentially dispensing and solidifying a plurality of layers. The plurality of layers may be formed with a plurality of different colored model materials, a flexible material arranged in a configured pattern to form a sacrificial structure at least partially encompassing the object, and a soft material. The soft material is arranged in a configured pattern to provide separation between the model material and the sacrificial structure. The plurality of different colored model materials is arranged in a configured pattern corresponding to the shape and color definition of the object.

17 Claims, 15 Drawing Sheets

Related U.S. Application Data continuation of application No. PCT/IL2018/051296, filed on Nov. 27, 2018.

(60) Provisional application No. 62/611,064, filed on Dec. 28, 2017.

(51) Int. Cl.

| | |
|---|---|
| ***B29C 64/40*** | (2017.01) |
| ***B29K 33/00*** | (2006.01) |
| ***B29K 509/08*** | (2006.01) |
| ***B33Y 10/00*** | (2015.01) |
| ***B33Y 30/00*** | (2015.01) |
| ***B33Y 70/10*** | (2020.01) |

(52) U.S. Cl.

CPC ............... *B33Y 10/00* (2014.12); *B33Y 30/00* (2014.12); *B33Y 70/10* (2020.01); *B29K 2033/12* (2013.01); *B29K 2509/08* (2013.01); *B29K 2995/0021* (2013.01); *B29K 2995/0098* (2013.01)

(56) References Cited

U.S. PATENT DOCUMENTS

| | | | |
|---|---|---|---|
| 6,259,962 B1 | 7/2001 | Gothait | |
| 6,569,373 B2 | 5/2003 | Napadensky | |
| 6,658,314 B1 | 12/2003 | Gothait | |
| 6,850,334 B1 | 2/2005 | Gothait | |
| 7,104,773 B2 | 9/2006 | Maekawa et al. | |
| 7,183,335 B2 | 2/2007 | Napadensky | |
| 7,209,797 B2 | 4/2007 | Kritchman et al. | |
| 7,225,045 B2 | 5/2007 | Gothait et al. | |
| 7,255,825 B2 | 8/2007 | Nielsen et al. | |
| 7,300,619 B2 | 11/2007 | Napadensky et al. | |
| 7,479,510 B2 | 1/2009 | Napadensky et al. | |
| 7,500,846 B2 | 3/2009 | Eshed et al. | |
| 7,962,237 B2 | 6/2011 | Kritchman | |
| 8,865,047 B2 | 10/2014 | Sella | |
| 9,031,680 B2 | 5/2015 | Napadensky | |
| 9,227,365 B2 | 1/2016 | Dikovsky et al. | |
| 11,584,089 B2 | 2/2023 | Shitrit et al. | |
| 2002/0096112 A1 | 7/2002 | Coe | |
| 2004/0187714 A1 | 9/2004 | Napadensky et al. | |
| 2005/0069784 A1 | 3/2005 | Gothait et al. | |
| 2005/0124491 A1 | 6/2005 | Hopkins | |
| 2005/0151789 A1* | 7/2005 | Yao | H04N 1/6022 347/43 |
| 2005/0233130 A1 | 10/2005 | Grefenstein et al. | |
| 2007/0168815 A1 | 7/2007 | Napadensky et al. | |
| 2008/0121130 A1 | 5/2008 | Kritchman | |
| 2010/0140850 A1 | 6/2010 | Napadensky et al. | |
| 2010/0191360 A1 | 7/2010 | Napadensky et al. | |
| 2012/0178845 A1 | 7/2012 | Napadensky et al. | |
| 2012/0261848 A1 | 10/2012 | Haraszati | |
| 2012/0308805 A1 | 12/2012 | Sella | |
| 2013/0011562 A1 | 1/2013 | Varanka | |
| 2015/0151487 A1 | 6/2015 | Leighton et al. | |
| 2015/0250971 A1 | 9/2015 | Bachelder et al. | |
| 2016/0001505 A1 | 1/2016 | Hakkaku et al. | |
| 2016/0100917 A1 | 4/2016 | Howe | |
| 2016/0136903 A1 | 5/2016 | Herran et al. | |
| 2016/0151979 A1* | 6/2016 | Urban | B29C 64/112 425/130 |
| 2016/0185050 A1 | 6/2016 | Topolkaraev et al. | |
| 2016/0355694 A1 | 12/2016 | Okamoto | |
| 2017/0087775 A1 | 3/2017 | Sakai et al. | |
| 2017/0136706 A1 | 5/2017 | Hakkaku | |
| 2017/0151718 A1 | 6/2017 | Rolland et al. | |
| 2017/0239886 A1 | 8/2017 | Norikane | |
| 2018/0111316 A1 | 4/2018 | Schaufelberger et al. | |
| 2018/0141241 A1 | 5/2018 | Staal et al. | |
| 2018/0281294 A1 | 10/2018 | Gottschalk-Gaudic et al. | |
| 2020/0198250 A1 | 6/2020 | Shitrit et al. | |
| 2020/0331195 A1 | 10/2020 | Rumbak et al. | |
| 2022/0031435 A1 | 2/2022 | Shitrit | |
| 2023/0191707 A1 | 6/2023 | Shitrit et al. | |

FOREIGN PATENT DOCUMENTS

| | | |
|---|---|---|
| CN | 1926470 | 3/2007 |
| CN | 102037064 | 4/2011 |
| CN | 103347682 | 10/2013 |
| CN | 103568325 | 2/2014 |
| CN | 204894515 | 12/2015 |
| CN | 105582571 | 5/2016 |
| CN | 105637035 | 6/2016 |
| CN | 106045503 | 10/2016 |
| CN | 106458659 | 2/2017 |
| CN | 106515000 | 3/2017 |
| CN | 106660266 | 5/2017 |
| EP | 2150077 | 2/2010 |
| EP | 3002110 | 4/2016 |
| EP | 3053728 | 8/2016 |
| EP | 3064193 | 9/2016 |
| JP | 07-195530 | 8/1995 |
| JP | 2004-255839 | 9/2004 |
| JP | 2010-537720 | 12/2010 |
| JP | 2015-038166 | 2/2015 |
| JP | 2015-123743 | 7/2015 |
| JP | 2015-131469 | 7/2015 |
| JP | 2015-136915 | 7/2015 |
| JP | 2015-168202 | 9/2015 |
| JP | 2016-26915 | 2/2016 |
| JP | 2016-078284 | 5/2016 |
| JP | 2017-043041 | 3/2017 |
| WO | WO 2009/032228 | 3/2009 |
| WO | WO 2015/105047 | 7/2015 |
| WO | WO 2016/125816 | 8/2016 |
| WO | WO 2018/220632 | 12/2018 |
| WO | WO 2019/130292 | 7/2019 |
| WO | WO 2018/220632 A9 | 3/2020 |
| WO | WO 2020/065653 | 4/2020 |

OTHER PUBLICATIONS

Communication Pursuant to Article 94(3) EPC Dated Jul. 7, 2020 From the European Patent Office Re. Application No. 18739649.4. (3 Pages).

Communication Pursuant to Article 94(3) EPC Dated Apr. 26, 2021 From the European Patent Office Re. Application No. 18819471.6. (7 Pages).

Decision of Rejection Dated Mar. 16, 2022 From the State Intellectual Property Office of the People's Republic of China Re. Application No. 201880046410.6 and Its English Summary. (8 Pages).

Decision to Grant Dated Aug. 30, 2022 From the Japan Patent Office Re. Application No. 2021-071914 and Its Translation Into English (6 Pages).

Final Official Action Dated Mar. 2, 2023 From the US Patent and Trademark Office Re. U.S. Appl. No. 17/279,762. (25 Pages).

Final Official Action Dated Sep. 13, 2021 from the US Patent and Trademark Office Re. U.S. Appl. No. 16/618,133. (22 pages).

Grounds of Reasons for Rejection Dated Mar. 3, 2020 From the Korean Patent Office Re. Application No. 10-2019-7038817 and Its Translation Into English. (12 Pages).

Grounds of Reasons for Rejection Dated Aug. 21, 2020 From the Korean Patent Office Re. Application No. 10-2019-7038817 and Its Translation Into English. (5 Pages).

International Preliminary Report on Patentability Dated Apr. 8, 2021 From the International Bureau of WIPO Re. Application No. PCT/IL2019/051067. (8 Pages).

International Preliminary Report on Patentability Dated Jul. 9, 2020 From the International Bureau of WIPO Re. Application No. PCT/IL2018/051296. (13 Pages).

International Preliminary Report on Patentability Dated Dec. 12, 2019 From the International Bureau of WIPO Re. Application No. PCT/IL2018/050590. (10 Pages).

(56) References Cited

OTHER PUBLICATIONS

International Search Report and the Written Opinion Dated Feb. 6, 2020 From the International Searching Authority Re. Application No. PCT/IL2019/051067. (12 Pages).
International Search Report and the Written Opinion Dated Mar. 8, 2019 From the International Searching Authority Re. Application No. PCT /IL2018/051296. (20 Pages).
International Search Report and the Written Opinion Dated Oct. 12, 2018 From the International Searching Authority Re. Application No. PCT/IL2018/050590. (17 Pages).
Notice of Allowance Dated Oct. 4, 2022 from US Patent and Trademark Office Re. U.S. Appl. No. 16/618,133. (18 pages).
Notice of Allowance Dated Oct. 4, 2023 together with Interview Summary Dated Sep. 26, 2023 from the US Patent and Trademark Office Re. U.S. Appl. No. 16/914,392. (12 pages).
Notice of Allowance Dated Jun. 15, 2023 from the US Patent and Trademark Office Re. U.S. Appl. No. 17/279,762. (8 pages).
Notice of Reason for Rejection Dated Nov. 27, 2020 From the Japan Patent Office Re. Application No. 2019-566114 and Its Translation Into English. (5 Pages).
Notice of Reason for Rejection Dated Jun. 30, 2020 From the Japan Patent Office Re. Application No. 2019-566114 and Its Translation Into English. (11 Pages).
Notice of Reason(s) for Rejection Dated Oct. 21, 2022 From the Japan Patent Office Re. Application No. 2021-517020 and Its Translation Into English. (6 pages).
Notice of Reasons for Rejection Dated Jun. 24, 2022 From the Japan Patent Office Re. Application No. 2020-536689 and Its Translation Into English. (6 Pages).
Notice of Reasons for Rejection Dated Feb. 25, 2022 From the Japan Patent Office Re. Application No. 2021-71914 and Its Translation Into English. (9 Pages).
Notification of Office Action and Search Report Dated Apr. 8, 2022 From the State Intellectual Property Office of the People's Republic of China Re. Application No. 201980061346.3 and Its Translation of Office Action Into English. (9 Pages).
Notification of Office Action and Search Report Dated Sep. 24, 2021 From the State Intellectual Property Office of the People's Republic of China Re. Application No. 201880088471.9 and Its English Summary. (13 Pages).
Notification of Office Action and Search Report Dated Mar. 25, 2021 From the State Intellectual Property Office of the People's Republic of China Re. Application No. 201880046410.6 and Its Translation of Office Action Into English. (14 Pages).
Notification of Office Action and Search Report Dated Sep. 28, 2020 From the State Intellectual Property Office of the People's Republic of China Re. Application No. 201880046410.6 and Its Translation of Office Action Into English. (9 Pages).
Notification of Office Action Dated Sep. 1, 2022 From the State Intellectual Property Office of the People's Republic of China Re. Application No. 201880088471.9. (5 Pages).
Notification of Office Action Dated Apr. 13, 2022 From the State Intellectual Property Office of the People's Republic of China Re. Application No. 201880088471.9 and Its Translation Into English. (9 Pages).
Notification of Office Action Dated Dec. 15, 2021 From the State Intellectual Property Office of the People's Republic of China Re. Application No. 201880046410.6. (7 Pages).
Notification of Office Action Dated Aug. 23, 2021 From the State Intellectual Property Office of the People's Republic of China Re. Application No. 201880046410.6. (6 Pages).
Office Action Dated May 9, 2021 From the Israel Patent Office Re. Application No. 278176 and Its Translation Into English. (7 Pages).
Office Action Dated Mar. 29, 2020 From the Israel Patent Office Re. Application No. 270998 and Its Translation Into English. (5 Pages).
Office Action Dated Oct. 31, 2023 From the Israel Patent Office Re. Application No. 275711. (3 Pages).
Official Action Dated Nov. 10, 2022 from the US Patent and Trademark Office Re. U.S. Appl. No. 16/914,392. (78 pages).
Official Action Dated Nov. 13, 2020 from the US Patent and Trademark Office Re. U.S. Appl. No. 16/618,133. (36 pages).
Official Action Dated Aug. 25, 2022 from US Patent and Trademark Office Re. U.S. Appl. No. 17/279,762. (42 pages).
Official Action Dated May 25, 2023 from the US Patent and Trademark Office Re. U.S. Appl. No. 16/914,392. (26 pages).
Official Action Dated Mar. 26, 2021 from the US Patent and Trademark Office Re. U.S. Appl. No. 16/618,133. (19 pages).
Official Action Dated May 31, 2022 from US Patent and Trademark Office Re. U.S. Appl. No. 16/618,133. (34 pages).
Restriction Official Action Dated Aug. 17, 2022 from US Patent and Trademark Office Re. U.S. Appl. No. 16/914,392. (12 pages).
Restriction Official Action Dated Apr. 27, 2023 From the US Patent and Trademark Office Re. U.S. Appl. No. 18/111,625. (8 Pages).
Restriction Official Action Dated Jun. 29, 2022 from US Patent and Trademark Office Re. U.S. Appl. No. 17/279,762. (8 pages).
Translation Dated Sep. 8, 2021 of Notification of Office Action Dated Aug. 23, 2021 From the State Intellectual Property Office of the People's Republic of China Re. Application No. 201880046410.6. (8 Pages).
Translation Dated Apr. 18, 2022 of Decision of Rejection Dated Mar. 16, 2022 From the State Intellectual Property Office of the People's Republic of China Re. Application No. 201880046410.6. (8 Pages).
Translation of Notification of Office Action Dated Sep. 1, 2022 From the State Intellectual Property Office of the People's Republic of China Re. Application No. 201880088471.9. (5 Pages).
Simplify 3D "Rafts, Skirts and Brimes", Simplify 3D, 7 P., Retrieved from Internet on Sep. 6, 2016.
Official Action Dated Nov. 27, 2024 From the US Patent and Trademark Office Re. U.S. Appl. No. 18/111,625. (39 Pages).

* cited by examiner

METHOD AND SYSTEM FOR ADDITIVE MANUFACTURING OF PEELABLE SACRIFICIAL STRUCTURE

RELATED APPLICATIONS

This application is a Division of U.S. patent application Ser. No. 16/914,392, filed on Jun. 28, 2020, which is a U.S. Continuation of PCT Patent Application No. PCT/IL2018/051296 having International Filing Date of Nov. 27, 2018, which claims the benefit of priority under 35 USC § 119(e) of U.S. Provisional Patent Application No. 62/611,064 filed on Dec. 28, 2017. The contents of the above applications are all incorporated by reference as if fully set forth herein in their entirety.

FIELD AND BACKGROUND OF THE INVENTION

The present invention, in some embodiments thereof, relates to additive manufacturing (AM), and, more particularly, but not exclusively, to method and system for additive manufacturing of peelable sacrificial structure.

Additive manufacturing (AM) is a technology enabling fabrication of arbitrarily shaped structures directly from computer data via additive formation steps. The basic operation of any AM system consists of slicing a three-dimensional computer model into thin cross sections, translating the result into two-dimensional position data and feeding the data to control equipment which fabricates a three-dimensional structure in a layerwise manner.

Additive manufacturing entails many different approaches to the method of fabrication, including three-dimensional (3D) printing such as 3D inkjet printing, electron beam melting, stereolithography, selective laser sintering, laminated object manufacturing, fused deposition modeling and others. 3D printing processes, for example, 3D inkjet printing, are being performed by a layer by layer inkjet deposition of building materials. Thus, a building material is dispensed from a dispensing head having a set of nozzles to deposit layers on a supporting structure. Depending on the building material, the layers may then be cured or solidified using a suitable device.

Various three-dimensional printing techniques exist and are disclosed in, e.g., U.S. Pat. Nos. 6,259,962, 6,569,373, 6,658,314, 6,850,334, 6,863,859, 7,183,335, 7,209,797, 7,225,045, 7,300,619, and 7,500,846 and U.S. Patent Application having Publication No. 20130073068, all by the same Assignee, and being hereby incorporated by reference in their entirety.

The building material of a typical AM process, includes a model material (also referred to as "modeling material"), which is deposited to produce the desired object, and a support material (also referred to as "supporting material") which provides temporary support to specific regions of the object during building and for assuring adequate vertical placement of subsequent object layers. For example, in cases where objects include overhanging features or shapes, e.g., curved geometries, negative angles, voids, and the like, objects are typically constructed using adjacent support constructions, which are used during the printing and then subsequently removed in order to reveal the final shape of the fabricated object.

Known methods for removal of support materials include water-jet impact, chemical methods, such as dissolution in a solvent, oftentimes in combination with thermal treatment. For example, for water soluble support material, the fabricated object, including its support structure, is immersed in water capable of dissolving the support material.

Support materials for AM are described, for example, in U.S. Pat. Nos. 6,228,923, 7,255,825, 7,479,510, 7,183,335 and 6,569,373, all to the present Assignee and being incorporated by reference in their entirety.

U.S. Pat. No. 8,865,047, assigned to the present Assignee and being incorporated by reference in its entirety, discloses a method of constructing a support construction in which the support construction includes a strip that intersects the layers in a volume designed to be an empty space in the 3D object. The support construction is removed from the volume by application of a lifting force on the strip.

SUMMARY OF THE INVENTION

According to an aspect of some embodiments of the present invention there is provided a method of additive manufacturing of a three-dimensional object. The method comprises: sequentially dispensing and solidifying a plurality of layers comprising (i) a stack of layers including a modeling material arranged in a configured pattern corresponding to the shape of the object, (ii) a stack of layers including a flexible material and forming a sacrificial structure, and (iii) a stack of layers including a soft material having an elastic modulus less than the flexible material and forming an intermediate structure between the object and the sacrificial structure; and applying a peeling force to the sacrificial structure (e.g., in dry environment) to separate the sacrificial structure from the object.

According to another aspect of the present invention there is provided a system for fabricating a three-dimensional object by additive manufacturing. The system comprises: a plurality of dispensing heads, for example at least a first dispensing head configured for dispensing a modeling material, a second dispensing head configured for dispensing a flexible material, and a third dispensing head configured for dispensing a soft material having an elastic modulus less than the flexible material; a solidification system configured for solidifying each of the materials; and a computerized controller having a circuit configured for operating the dispensing heads and solidification system to sequentially dispense and solidify the plurality of layers as delineated above and optionally and preferably as further detailed and exemplified below.

According to a further aspect of the present invention there is provided a three dimensional inkjet color printer that is suitable for home and office environment. In some example implementations, the suitability for home and office use is based on the printer forming at least a portion of the sacrificial structure using a material that may be easily separated from the model structure, i.e. from the printed 3D object e.g., by manually peeling the sacrificial structure away from the object. Optionally, the flexible material forming at least a portion of the peelable sacrificial structure is an elastomeric material. The separation may be performed at the termination of the printing process without requiring dedicated equipment or solvents. In this manner, the sacrificial structure may be removed quickly, in a tidy manner and with little waste production. In some example embodiments, additional portions of the sacrificial structure may be formed with a soft material, such as, but not limited to, a material that is soluble in water or solvent. Optionally, the soft material is applied between the model material forming the object and the flexible material of the sacrificial structure, i.e. intermediate structure, and may attach to the peelable flexible material and be peeled off together with it.

Optionally, the soft material or remnants of soft material of the intermediate structure on the object may be easily removed by rubbing or immersing the object in water once the flexible material is removed.

In example implementations, the suitability for home and office use is additionally based on a compact size of the three-dimensional inkjet color printing system, for printing full-colored objects, the compact system comprising at most three printing heads, e.g. each head comprising two linear arrays of nozzles. Each array of nozzles is dedicated to printing a different material, such that, for example, the system deposits five different colored modeling materials and a support material. In order to use a flexible material for providing the sacrificial structure of the invention, without necessitating the addition of another printing head and thus compromising the compact size of the printing system, the flexible material may be used in place of one of the colored modeling materials, such that the compact system deposits four different colored modeling materials, a flexible material and a support material. Optionally, a flexible material having a color similar to that of the colored modeling material it replaces is selected, optionally and preferably the black modeling material. In some example embodiments, the lacking modeling material color, e.g., black, is instead produced by digitally combining other colored modeling materials provided for use with the printer, e.g. a combination of Cyan, Magenta and Yellow (CMY).

The present inventors have found that the mechanical properties of the object are not significantly affected when using the flexible material as a substitute to one of the modeling materials in the object, for instance when fine details are produced in the object or when using the flexible material to produce relatively small volumetric portions of the object. Thus, black flexible material may for example be used for producing fine details in the 3D object being formed, in addition to being used as a peelable material for the sacrificial structure.

According to an aspect of some example embodiments, there is provided a method of additive manufacturing of a three-dimensional object comprising: sequentially dispensing and solidifying a plurality of layers, wherein the plurality of layers is formed with (i) a plurality of different colored model materials arranged in a configured pattern corresponding to the shape and color definition of the object, (ii) a flexible material arranged in a configured pattern to form a sacrificial structure at least partially encompassing the object, and (iii) a soft material arranged in a configured pattern to provide separation between the model material and the sacrificial structure.

Optionally, the soft material has an elastic modulus less than the flexible material.

Optionally, the plurality of different color model materials does not include a black model material.

Optionally, the flexible material is black.

Optionally, a black portion of the object is formed based on (i) digital mixing the plurality of different colored model materials to create a black color; (ii) an amount of black flexible material; or (iii) a combination of (i) and (ii).

Optionally, the flexible material is black.

According to an aspect of some example embodiments, there is provided a computer software product, comprising a computer-readable medium in which program instructions are stored, which instructions, when read by a computerized controller of an additive manufacturing system, cause said system to sequentially dispense and solidify a plurality of layers formed with (i) a plurality of different colored model materials arranged in a configured pattern corresponding to the shape and color definition of the object, (ii) a flexible material arranged in a configured pattern to form a sacrificial structure at least partially encompassing the object, and (iii) a soft material arranged in a configured pattern to provide separation between the model material and the sacrificial structure.

Optionally, the plurality of different color model materials does not include a black model material.

Optionally, the flexible material is black.

Optionally, the instructions include commands to create a black color in the object by (i) digitally mixing a plurality of colored model materials; (ii) printing an amount of black flexible material; or (iii) a combination of (i) and (ii).

According to an aspect of some example embodiments, there is provided an additive manufacturing (AM) system for fabricating a three-dimensional colored object, the system comprising: a building material supply apparatus configured to hold a group of supply cartridges wherein said group of supply cartridges comprises a set of cartridges with different colored model materials, a cartridge containing a flexible material, and a cartridge containing a soft material, the soft material having an elastic modulus less than the flexible material; nozzle arrays mounted in dispensing heads configured to receive materials from the building material supply apparatus; a solidification system configured for solidifying the materials dispensed from the dispensing heads; and a computerized controller having a circuit configured for operating the dispensing heads and the solidification system to sequentially dispense and solidify a plurality of layers comprising (i) a plurality of different colored model materials arranged in a configured pattern corresponding to the shape and color definition of the object, (ii) the flexible material arranged in a configured pattern to form a sacrificial structure at least partially encompassing the object, and (iii) the soft material arranged in a configured pattern to provide separation between the model material and the sacrificial structure.

Optionally, the plurality of different color model materials does not include black model material.

Optionally, the flexible material is black.

Optionally, the dispensing heads are configured to be operated to print a black color in the object by printing (i) a digital mix of the plurality of different colored model materials; (ii) an amount of black flexible material; or (iii) a combination of (i) and (ii).

According to an aspect of some example embodiments, there is provided an AM system for fabricating a three-dimensional object, the system comprising: a building material supply apparatus configured to hold up to six supply cartridges, wherein the supply cartridges are selected from a group including cartridges with different colored model materials, cartridges with flexible material, and cartridges with soft material, the soft material having an elastic modulus less than the flexible material; up to six nozzle arrays mounted in dispensing heads configured to receive materials from the building material supply apparatus; a solidification system configured for solidifying the materials dispensed from the dispensing heads; and a computerized controller having a circuit configured for operating the dispensing heads and the solidification system to sequentially dispense and solidify a plurality of layers comprising (i) a plurality of different colored model materials arranged in a configured pattern corresponding to the shape and color definition of the object, (ii) the flexible material arranged in a configured pattern to form a sacrificial structure at least partially encompassing the object, and (iii) the soft material arranged in a configured pattern to provide separation between the model material and the sacrificial structure; wherein the plurality of different color model materials does not include black model material.

According to an aspect of some example embodiments, there is provided a system for fabricating a three-dimensional object by additive manufacturing, the system comprising: a building material supply apparatus configured to hold up to six supply cartridges, wherein the supply cartridges are selected from a group including cartridges with different colored model materials, cartridges with flexible material, and cartridges with soft material, the soft material having an elastic modulus less than the flexible material; and wherein the different colored model materials includes white, cyan, magenta, and yellow; up to three dispensing heads configured to receive materials from the building material supply apparatus; a solidification system configured for solidifying each of the materials; and a computerized controller having a circuit configured for operating the dispensing heads and solidification system to sequentially dispense and solidify a plurality of layers comprising (i) the different colored model materials arranged in a configured pattern corresponding to the shape and color definition of the object, (ii) the flexible material arranged in a configured pattern to form a sacrificial structure at least partially encompassing the object, and (iii) the soft material arranged in a configured pattern to provide separation between the model material and the sacrificial structure; wherein at least a portion of the three dispensing heads are configured to be operated to digitally mix cyan, magenta, and yellow to create a black color in the object.

Optionally, the flexible material is black and wherein the flexible material is applied to form at least a portion of the object that is defined to be in black.

Optionally, the flexible material is black and wherein the flexible material is included in the digital mix of the plurality of different colored model materials to create the black color in the object.

Optionally, a black portion of the object is formed based on digital mixing of the plurality of different colored model materials as long as a volume of the black portion is larger than a defined threshold.

Optionally, a black portion of the object is formed with the flexible material as long as the volume of the black portion is smaller than the defined threshold.

Optionally, the soft material is arranged in a configured pattern to form divisions in the sacrificial structure.

Optionally, the divisions are formed on symmetrical planes to the object.

Optionally, the soft material is configured to fill holes defined by geometry of the object.

Optionally, the soft material is configured to encompass delicate features susceptible to breaking if a pulling or peeling force is applied in their vicinity.

Optionally, the soft material is formed from a gel that is water soluble.

Optionally, a thickness of the separation between the model material and the sacrificial structure provided by the soft material is 100 microns to 300 microns.

Optionally, a minimal thickness of the sacrificial structure is from about 500 microns to about 3 mm.

Optionally, a flexural modulus of at least a portion of the model material is 2000 MPa to 4000 MPa.

Optionally, the model material comprises at least one additional, non-curable material, wherein the non-curable material is selected from a group including: a colorant, an initiator, a dispersant, a surfactant, a stabilizer and an inhibitor.

Optionally, the sacrificial structure is characterized, once solidified, by a tear resistance of at least 4 kN per meter, when measured according to international standard ASTM D-624, once solidified.

Optionally, the sacrificial structure is characterized, once solidified, by a tear resistance of from about 4 kN per meter to about 8 kN per meter, when measured according to international standard ASTM D-624.

Optionally, the sacrificial layer is configured to be peeled and wherein a magnitude of the peeling force is from about 1 N to about 20 N.

Optionally, the sacrificial layer is configured such that the peeling force of 5 N results in a bending strain of at least 0.02.

Optionally, the flexible material is a formulation comprising silica particles.

Optionally, the formulation is characterized, when hardened, by a tear resistance which is higher by at least 0.5 kN per meter than, a solidified formulation having the same flexible material but devoid of the silica particles.

Optionally, the silica particles have an average particle size less than 1 micron.

Optionally, at least a portion of the silica particles comprise a hydrophilic surface.

Optionally, at least a portion of the silica particles comprise a hydrophobic surface.

Optionally, at least a portion of the silica particles comprise functionalized silica particles.

Optionally, at least a portion of the silica particles are functionalized by curable functional groups.

Optionally, the curable functional groups comprise (meth) acrylate groups.

Optionally, an amount of the silica particles in the formulation ranges from about 1 to about 20, or from about 1 to about 15, or from about 1 to about 10, weight percents, of the total weight of the formulation.

Optionally, a weight ratio of the flexible material and the silica particles ranges from about 30:1 to about 4:1.

Optionally, an amount of the flexible material is at least 40%, or at last 50%, by weight of a total weight of the formulation.

Optionally, the flexible material includes one or more of: a mono-functional elastomeric monomer, a mono-functional elastomeric oligomer, a multi-functional elastomeric monomer, multi-functional elastomeric oligomer.

Optionally, the formulation comprises an additional curable material.

Optionally, the formulation comprises an elastomeric mono-functional curable material, an elastomeric multi-functional curable material, and an additional mono-functional curable material.

Optionally, a concentration of the elastomeric mono-functional material ranges from about 10% to about 30%, by weight.

Optionally, a concentration of the elastomeric mono-functional curable material ranges from about 50% to about 70%, by weight.

Optionally, a concentration of the elastomeric multi-functional curable material ranges from about 10% to about 20%, by weight.

Optionally, a concentration of the curable mono-functional material ranges from about 20% to about 30%, by weight.

Optionally, a concentration of the elastomeric mono-functional curable material ranges from about 30% to about 50%, by weight.

Optionally, a concentration of the elastomeric multifunctional curable material ranges from about 10% to about 30%, by weight.

Optionally, the flexible material is a UV-curable elastomeric material.

the flexible material is an acrylic elastomer.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions.

Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings and images. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1A:
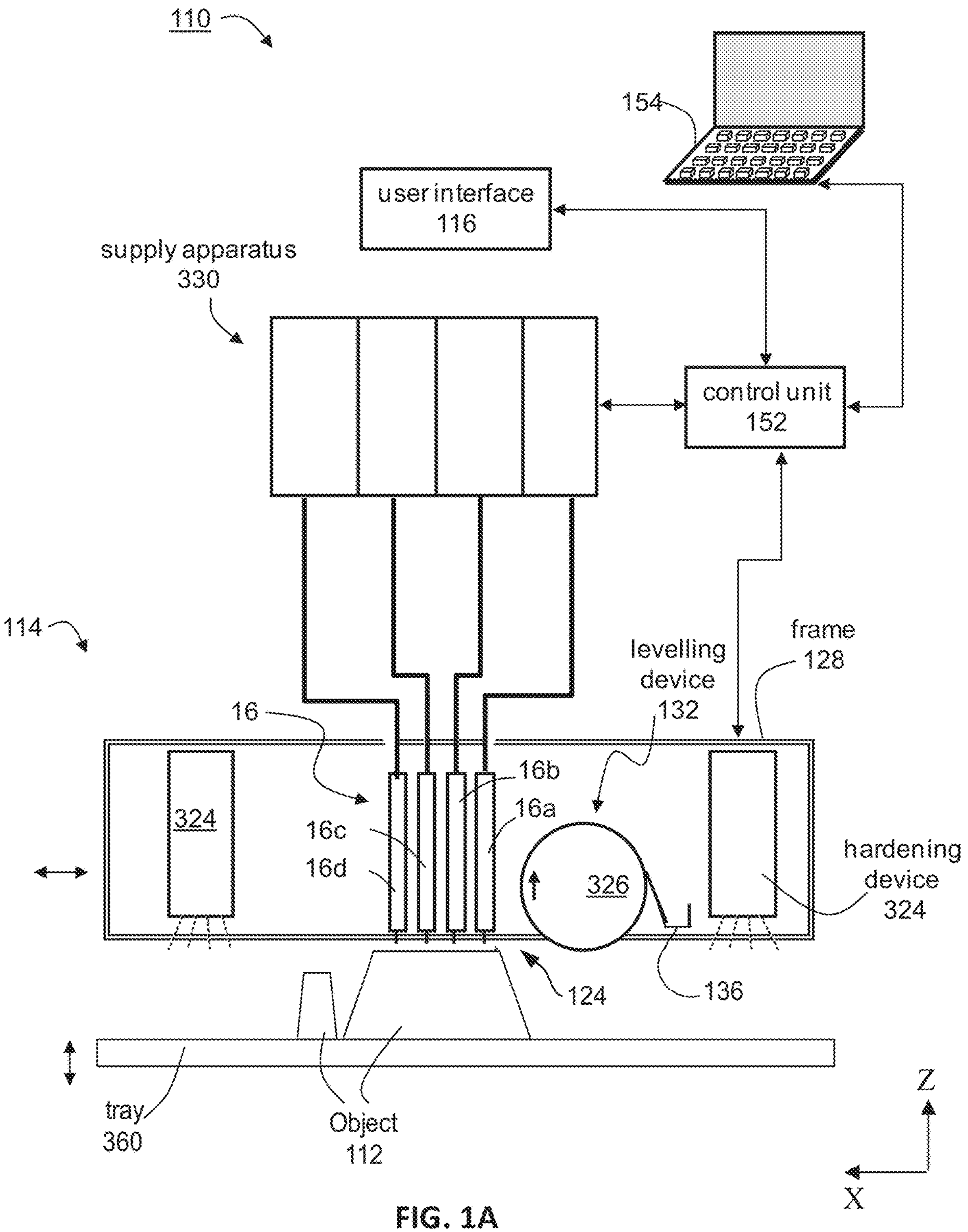
FIGS. 1A, 1B, 1C and 1D are schematic illustrations of additive manufacturing systems according to some embodiments of the invention.

The present invention, in some embodiments thereof, relates to additive manufacturing (AM), and, more particularly, but not exclusively, to method and system for additive manufacturing of a peelable sacrificial structure for a full-colored 3D object formed by an AM apparatus.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The method and system of the present embodiments manufacture three-dimensional objects based on computer object data in a layerwise manner by forming a plurality of layers in a configured pattern corresponding to the shape of the objects. The computer object data can be in any known format, including, without limitation, a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD).

The term "object" as used herein refers to a whole object or a part thereof. The term "object" describes a final product of the additive manufacturing. This term refers to the product obtained by a method as described herein, after removal of the support material, if such has been used as part of the building material. The "object" therefore essentially consists (at least 95 weight percents) of a hardened (e.g., cured) modeling material.

Each layer is formed by an additive manufacturing apparatus which scans a two-dimensional surface and patterns it. While scanning, the apparatus visits a plurality of target locations on the two-dimensional layer or surface, and decides, for each target location or a group of target locations, whether or not the target location or group of target locations is to be occupied by building material, and which type of building material is to be delivered thereto. The decision is made according to a computer image of the surface.

The term digital mixing refers to dispensing two or more materials optionally having different colors or properties in an interlaced manner, on a microscopic scale or voxel level. Such digital mixing may exhibit, when observed macroscopically, a new color or property that is different than the colors or properties of the individual materials.

Each voxel or voxel block results in a different model material and the new color, for example, of the digitally mixed region is a result of a spatial combination, on the voxel level, of several different model materials.

The term "at the voxel level" as used herein in the context of a different material and/or colors, encompasses differences between voxel blocks, as well as differences between individual voxels or groups of a few voxels.

In some embodiments of the present invention the AM comprises three-dimensional printing, more preferably three-dimensional inkjet printing. In these embodiments a building material is dispensed from a dispensing head having a set of nozzles to deposit building material in layers on a supporting structure. The AM apparatus thus dispenses building material in target locations which are to be occupied and leaves other target locations void.

The apparatus according to some embodiments of the invention includes a plurality of dispensing heads, each of which is configured to dispense one or more different building materials. Thus, different target locations can be occupied by different building materials. The types of building materials can be categorized into two major categories: modeling material and support material. The support material serves as a supporting matrix or construction for supporting the object or object parts during the fabrication process and/or other purposes, e.g., providing hollow or porous objects. Support constructions may additionally include modeling material elements, e.g. for further support strength.

The modeling material is generally a composition which is formulated for use in additive manufacturing and which is optionally and preferably able to form a three-dimensional object on its own, i.e., without having to be mixed or combined with any other substance.

The final three-dimensional object is made of the modeling material or a combination of two or more modeling materials, or a combination of modeling and support materials, or modification thereof (e.g., following solidification, such as, but not limited to, curing). All these operations are well-known to those skilled in the art of solid freeform fabrication.

The material(s) are optionally and preferably deposited in layers during the same pass of the printing heads of the AM apparatus. The material(s) and combination(s) of materials within the layer can be selected according to the desired properties of the object being printed.

According to some example embodiments of the present disclosure, an AM apparatus, such as a three dimensional inkjet printer may print three-dimensional objects with a plurality of different colors and may also print a sacrificial structure that may be easily separated from the three-dimensional object in a manner that is suitable for home and office use. Existing systems generally form sacrificial structures using materials which are not easily separable from the three-dimensional object. They are typically messy and dedicated equipment is needed to remove the sacrificial structure from the printed object. These known methods are not convenient for home or office environment. The present inventors have found that there is a need for clean and easily removable sacrificial structures, and have devised a technique that allows such easy removal. The material forming the sacrificial structure may have elastomeric qualities that make it suitable for being peeled away from the modeling material forming the object.

A three dimensional inkjet printer for home and office use is optionally and preferably compact in design and easy to use. In some example embodiments, the compact printer or printing system according to some example embodiments comprises at most three inkjet printing heads, e.g. each head comprising two linear arrays of nozzles, wherein each array of nozzles may be dedicated to printing a different material, such that, for example, the system is able to deposit five different colored modeling materials and a support material, typically, cyan, magenta, yellow, black, white, and a support material.

In order to add a flexible material for forming the peelable sacrificial construction, or at least part thereof, without compromising on the compactness of the printing system, e.g. without adding an additional printing head, one of the colored modeling materials can be replaced with a flexible material having a color similar to that of the colored modeling material it replaces, for forming the sacrificial structure. Thus, the compact system deposits four different colored modeling materials, a flexible material and a support material.

While any one or several of the color modeling materials may be replaced with a flexible material according to embodiments of the invention, the inventors have found that replacing the black modeling material with a black flexible material is advantageous for several reasons: (1) black color is not extensively used as a modeling material when printing a full-color object; (2) 3D digital colors do not generally require a high amount of black "voxels" to obtain the desired color effect; (3) large black regions of the object requiring black modeling material can be created either by depositing the black flexible material alone, a digital combination of color modeling material resulting in a black color, e.g. Cyan, Magenta and Yellow (CMY), or a digital combination of the black flexible material together with CMY modeling material; (4) fine details and small volumes of the object that are in black, i.e. when needed in small quantities, may be formed with the black flexible material without significantly affecting the mechanical properties of the object.

It will be easily understood by the skilled artisan that while the present embodiments may be particularly suitable for a compact full color system comprising three dual linear channel printheads (or six single linear channel print heads) for printing five base colored modeling materials and one support material (CMYKW-S), the invention is also suitable for full color systems comprising additional or alternative colored modeling materials, such as clear, orange, violet, light cyan, light magenta, which would necessitate more than three dual channel (or six single channel) print heads to generate the available color palette. In some specific embodiments of the invention, the full color printing system comprises at least four channels (i.e. nozzle arrays, such as a linear nozzle array) for jetting base colored modeling materials, at least one channel for jetting a soft material and at least one channel for jetting a flexible material, preferably a black flexible material.

Figure 2A:
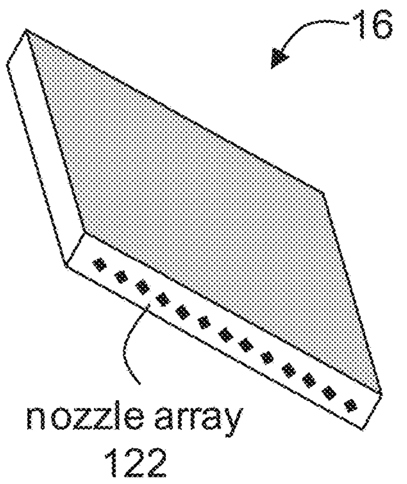
FIGS. 2A, 2B and 2C are schematic illustrations of printing heads according to some embodiments of the present invention.
Figure 2B:
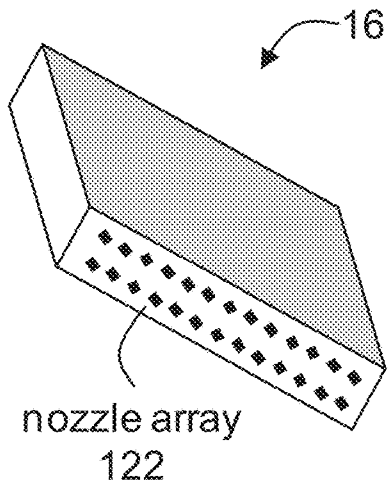
Figure 2C:
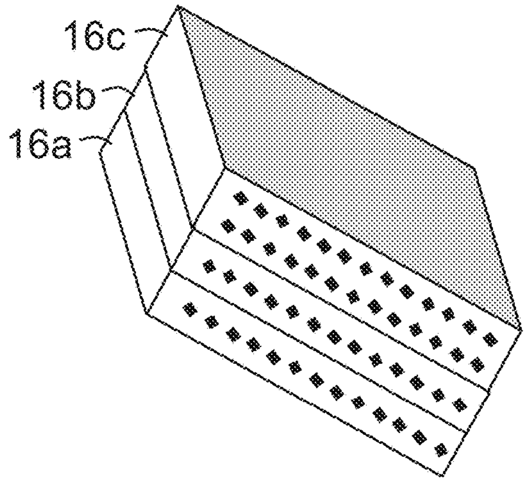

A representative and non-limiting example of a system 110 suitable for AM of an object 112 according to some embodiments of the present invention is illustrated in FIG. 1A. System 110 comprises an additive manufacturing apparatus 114 having a dispensing unit 16 which comprises a plurality of dispensing heads. Each head preferably comprises an array of one or more nozzles 122, as illustrated in FIGS. 2A-C described below, through which a liquid building material 124 is dispensed.

Preferably, but not obligatorily, apparatus 114 is a three-dimensional printing apparatus, in which case the dispensing heads are printing heads, and the building material is dispensed via inkjet technology. This need not necessarily be the case, since, for some applications, it may not be necessary for the additive manufacturing apparatus to employ three-dimensional printing techniques. Representative examples of additive manufacturing apparatus contemplated according to various exemplary embodiments of the present invention include, without limitation, fused deposition modeling apparatus and fused material deposition apparatus.

Each dispensing head is optionally and preferably fed via a building material reservoir which may optionally include a temperature controller (e.g., a temperature sensor and/or a heating device), and a material level sensor. To dispense the building material, a voltage signal is applied to the dispensing heads to selectively deposit droplets of material via the dispensing head nozzles, for example, as in piezoelectric inkjet printing technology. The dispensing rate of each head depends on the number of nozzles, the type of nozzles and the applied voltage signal rate (frequency). Such dispensing heads are known to those skilled in the art of solid freeform fabrication.

In the representative example of FIG. 1A, four dispensing heads 16*a*, 16*b*, 16*c* and 16*d* are illustrated. Each of heads 16*a*, 16*b*, 16*c* and 16*d* has a nozzle array. In this Example, heads 16*a* and 16*b* can be designated for modeling material(s) and heads 16*c* and 16*d* can be designated for support material. Thus, head 16*a* can dispense a first modeling material, head 16*b* can dispense a second modeling material and heads 16*c* and 16*d* can both dispense support material. In an alternative embodiment, each of heads 16*a*, 16*b* and 16*c* can dispense one or more different modeling materials. In an alternative embodiment, heads 16*c* and 16*d*, for example, may be combined in a single head having two nozzle arrays for depositing support material. In another alternative embodiment, heads 16*a* and 16*b*, may both dispense the same modeling material, or be combined in a single head having two nozzle arrays for depositing one or two different modeling materials. In another alternative embodiment, dispensing unit 16 comprises only head 16*a* (for dispensing a modeling material) and 16*c* (for dispensing a support material), and system 110 does not include any additional dispensing head other than heads 16*a* and 16*c*.

Yet it is to be understood that it is not intended to limit the scope of the present invention and that the number of modeling material depositing heads (modeling heads), the number of support material depositing heads (support heads), and the number of nozzle arrays in any one or more of the heads may differ.

In a preferred embodiment, there are M modeling heads each having m arrays of p nozzles, and S support heads each having s arrays of q nozzles such that M×m×p=S×s×q. Each of the M×m modeling arrays and S×s support arrays can be manufactured as a separate physical unit, which can be assembled and disassembled from the group of arrays. In this embodiment, each such array optionally and preferably comprises a temperature controller and a material level sensor of its own, and receives an individually controlled voltage or voltages for its operation.

Apparatus 114 can further comprise a solidification system 324, e.g. hardening device 324, which can include any device configured to emit light, heat or the like that may cause the deposited material to solidify and optionally and preferably harden. For example, solidification system 324 can comprise one or more radiation sources, which can be, for example, an ultraviolet or visible or infrared lamp, or other sources of electromagnetic radiation, or electron beam source, depending on the modeling material being used. In some embodiments of the present invention, solidification system 324 serves for curing or solidifying the modeling material. In some embodiments of the present invention, solidification system 324 serves for curing or solidifying both the modeling material and the support material.

The dispensing heads and radiation source are preferably mounted on a frame or block 128 which is preferably operative to reciprocally move over a tray 360, which serves as the working surface. In some embodiments of the present invention the radiation sources are mounted in the block such that they follow in the wake of the dispensing heads to at least partially solidify (e.g., cure) the materials just dispensed by the dispensing heads. Tray 360 is positioned horizontally. According to the common conventions an X-Y-Z Cartesian coordinate system is selected such that the X-Y plane is parallel to tray 360. Tray 360 is preferably configured to move vertically (along the Z direction), typically downward. In various exemplary embodiments of the invention, apparatus 114 further comprises one or more leveling devices 132, e.g. a roller 326. Leveling device 326 serves to straighten, level and/or establish a thickness of the newly formed layer prior to the formation of the successive layer thereon. Leveling device 326 preferably comprises a waste collection device 136 for collecting excess material generated during leveling. Waste collection device 136 may comprise any mechanism that delivers the material to a waste tank or waste cartridge.

In use, the dispensing heads of unit 16 move in a scanning direction, which is referred to herein as the X direction, and selectively dispense building material in a predetermined configuration in the course of their passage over tray 360. The building material typically comprises one or more types of support material and one or more types of modeling material. The passage of the dispensing heads of unit 16 is followed by the curing of the modeling material(s) by radiation source 126. In the reverse passage of the heads, back to their starting point for the layer just deposited, an additional dispensing of building material may be carried out, according to predetermined configuration. In the forward and/or reverse passages of the dispensing heads, the layer thus formed may be straightened by leveling device 326, which preferably follows the path of the dispensing heads in their forward and/or reverse movement. Once the dispensing heads return to their starting point along the X direction, they may move to another position along an indexing direction, referred to herein as the Y direction, and continue to build the same layer by reciprocal movement along the X direction.

Alternately, the dispensing heads may move in the Y direction between forward and reverse movements or after more than one forward-reverse movement. The series of scans performed by the dispensing heads to complete a single layer is referred to herein as a single scan cycle.

Once the layer is completed, tray 360 is lowered in the Z direction to a predetermined Z level, according to the desired thickness of the layer subsequently to be printed. The procedure is repeated to form three-dimensional object 112 in a layer-wise manner.

In another embodiment, tray 360 may be displaced in the Z direction between forward and reverse passages of the dispensing head of unit 16, within the layer. Such Z displacement is carried out in order to cause or ensure contact of the leveling device with the surface in one direction and prevent contact in the other direction.

System 110 optionally and preferably comprises a building material supply system or apparatus 330 which comprises the building material containers or cartridges and supplies a plurality of building materials to the printing heads of fabrication apparatus 114.

A computerized controller e.g. control unit 152 controls fabrication apparatus 114 and optionally and preferably also controls supply system 330. Controller 152 typically includes an electronic circuit configured to perform the controlling operations. Controller 152 preferably communicates with a data processor 154 which transmits digital data pertaining to fabrication instructions based on computer object data, e.g., a CAD configuration represented on a computer readable medium in any of the aforementioned formats (e.g., STL). Typically, controller 152 controls the voltage applied to each dispensing head or nozzle array and the temperature of the building material in the respective printing head.

Once the manufacturing data is loaded to controller 152 it can operate without user intervention. In some embodiments, controller 152 receives additional input from the operator, e.g., using data processor 154 or using a user interface 116 communicating with unit 152. User interface 116 can be of any type known in the art, such as, but not limited to, a keyboard, a touch screen and the like. For example, controller 152 can receive, as additional input, one or more building material types and/or attributes, such as, but not limited to, color, characteristic distortion and/or transition temperature, viscosity, electrical property, magnetic property. Other attributes and groups of attributes are also contemplated.

Figure 1B:
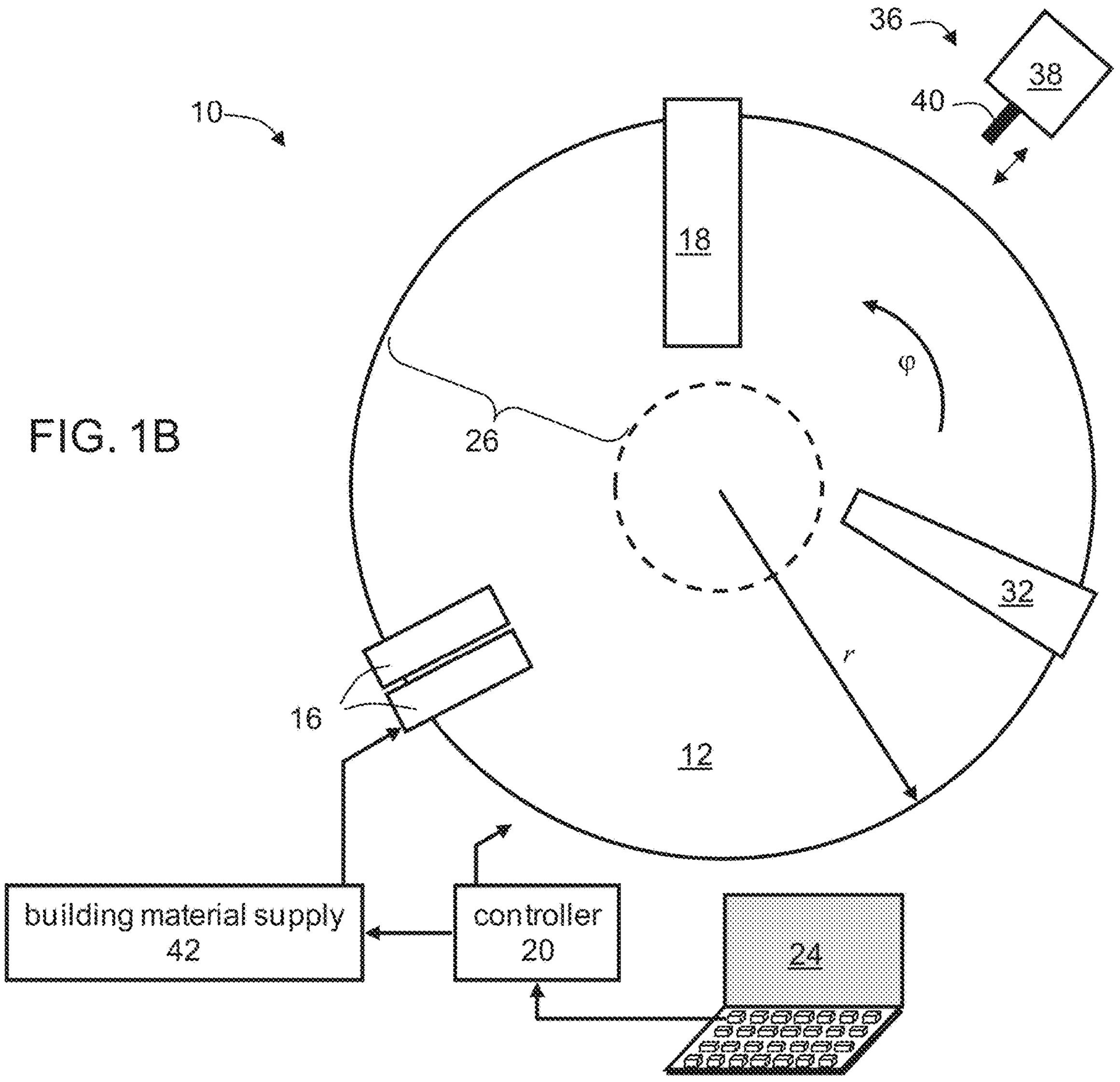
Figure 1C:
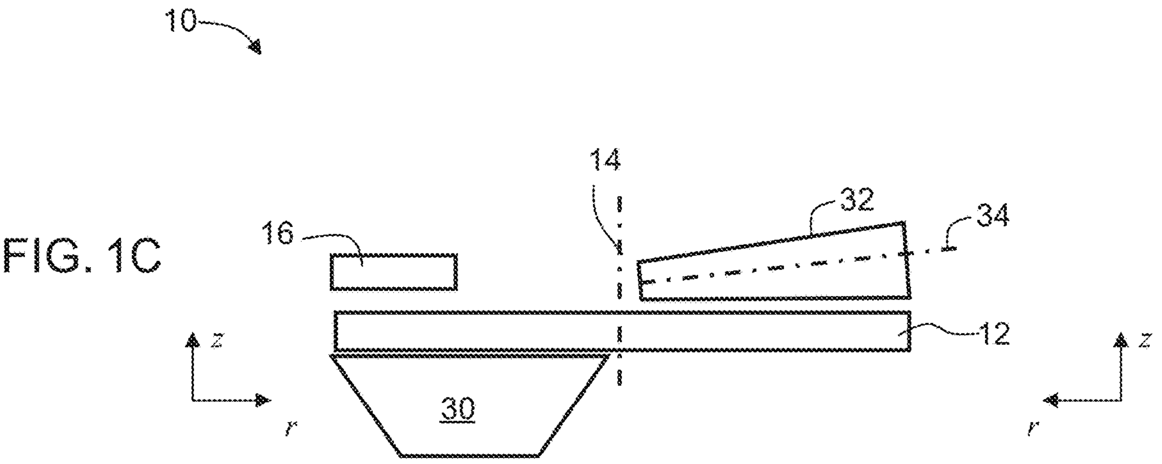
Figure 1D:
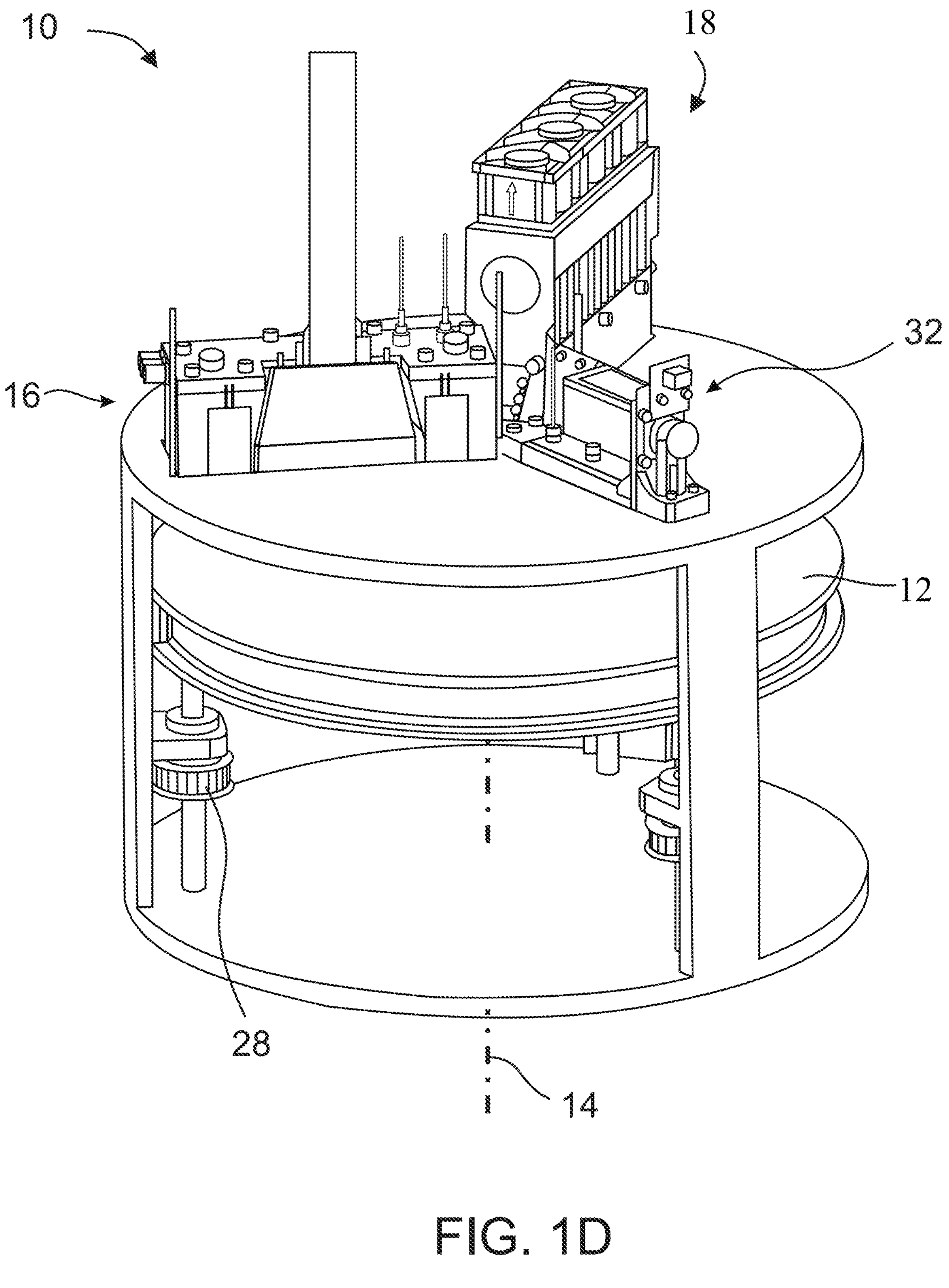

Another representative and non-limiting example of a system 10 suitable for AM of an object according to some embodiments of the present invention is illustrated in FIGS. 1B-D. FIGS. 1B-D illustrate a top view (FIG. 1B), a side view (FIG. 1C) and an isometric view (FIG. 1D) of system 10, respectively.

In the present embodiments, system 10 comprises a tray 12 and a plurality of dispensing heads 16, optionally and preferably inkjet printing heads, each having a plurality of separated nozzles. Tray 12 can have a shape of a disk or it can be annular. Non-round shapes are also contemplated, provided they can be rotated about a vertical axis.

Tray 12 and heads 16 are optionally and preferably mounted such as to allow a relative rotary motion between tray 12 and heads 16. This can be achieved by (i) configuring tray 12 to rotate about a vertical axis 14 relative to heads 16, (ii) configuring heads 16 to rotate about vertical axis 14 relative to tray 12, or (iii) configuring both tray 12 and heads 16 to rotate about vertical axis 14 but at different rotation velocities (e.g., rotation at opposite direction). While the embodiments below are described with a particular emphasis to configuration (i) wherein the tray is a rotary tray that is configured to rotate about vertical axis 14 relative to heads 16, it is to be understood that the present application contemplates also configurations (ii) and (iii). Any one of the embodiments described herein can be adjusted to be applicable to any of configurations (ii) and (iii), and one of ordinary skills in the art, provided with the details described herein, would know how to make such adjustment.

In the following description, a direction parallel to tray 12 and pointing outwardly from axis 14 is referred to as the radial direction r, a direction parallel to tray 12 and perpendicular to the radial direction r is referred to herein as the azimuthal direction φ, and a direction perpendicular to tray 12 is referred to herein is the vertical direction z.

The term "radial position," as used herein, refers to a position on or above tray 12 at a specific distance from axis 14. When the term is used in connection to a printing head, the term refers to a position of the head which is at specific distance from axis 14. When the term is used in connection to a point on tray 12, the term corresponds to any point that belongs to a locus of points that is a circle whose radius is the specific distance from axis 14 and whose center is at axis 14.

The term "azimuthal position," as used herein, refers to a position on or above tray 12 at a specific azimuthal angle relative to a predetermined reference point. Thus, radial position refers to any point that belongs to a locus of points that is a straight line forming the specific azimuthal angle relative to the reference point.

The term "vertical position," as used herein, refers to a position over a plane that intersects the vertical axis 14 at a specific point.

Tray 12 serves as a horizontal surface for three-dimensional printing. The working area on which one or more objects are printed is typically, but not necessarily, smaller than the total area of tray 12. In some embodiments of the present invention the working area is annular. The working area is shown at 26. In some embodiments of the present invention tray 12 rotates continuously in the same direction throughout the formation of object, and in some embodiments of the present invention tray reverses the direction of rotation at least once (e.g., in an oscillatory manner) during the formation of the object. Tray 12 is optionally and preferably removable. Removing tray 12 can be for maintenance of system 10, or, if desired, for replacing the tray before printing a new object. In some embodiments of the present invention system 10 is provided with one or more different replacement trays (e.g., a kit of replacement trays), wherein two or more trays are designated for different types of objects (e.g., different weights) different operation modes (e.g., different rotation speeds), etc. The replacement of tray 12 can be manual or automatic, as desired. When automatic replacement is employed, system 10 comprises a tray replacement device 36 configured for removing tray 12 from its position below heads 16 and replacing it by a replacement tray (not shown). In the representative illustration of FIG. 1B tray replacement device 36 is illustrated as a drive 38 with a movable arm 40 configured to pull tray 12, but other types of tray replacement devices are also contemplated.

In some embodiments, system 10 comprises a tray support member 30 positioned below heads 16 such that tray 12 is between tray support member 30 and heads 16. Tray support member 30 may serve for preventing or reducing vibrations of tray 12 that may occur while heads 16 operate. In configurations in which printing heads 16 rotate about axis 14, tray support member 30 preferably also rotates such that tray support member 30 is always directly below heads 16 (with tray 12 between heads 16 and tray 12).

Tray 12 and/or printing heads 16 is optionally and preferably configured to move along the vertical direction z, parallel to vertical axis 14 so as to vary the vertical distance between tray 12 and printing heads 16. In configurations in which the vertical distance is varied by moving tray 12 along the vertical direction, tray support member 30 preferably also moves vertically together with tray 12. In configurations in which the vertical distance is varied by heads 16 along the vertical direction, while maintaining the vertical position of tray 12 fixed, tray support member 30 is also maintained at a fixed vertical position.

The vertical motion can be established by a vertical drive 28. Once a layer is completed, the vertical distance between tray 12 and heads 16 can be increased (e.g., tray 12 is lowered relative to heads 16) by a predetermined vertical step, according to the desired thickness of the layer subsequently to be printed. The procedure is repeated to form a three-dimensional object in a layer-wise manner.

The operation of heads 16 and optionally and preferably also of one or more other components of system 10, e.g., the motion of tray 12, are controlled by a controller 20. The controller can have an electronic circuit and a non-volatile memory medium readable by the circuit, wherein the memory medium stores program instructions which, when read by the circuit, cause the circuit to perform control operations as further detailed below.

Controller 20 can also communicate with a host computer 24 which transmits digital data pertaining to fabrication instructions based on computer object data in any of the aforementioned formats. The object data formats are typically structured according to a Cartesian system of coordinates. In these cases, computer 24 preferably executes a procedure for transforming the coordinates of each slice in the computer object data from a Cartesian system of coordinates into a polar system of coordinates. Computer 24 optionally and preferably transmits the fabrication instructions in terms of the transformed system of coordinates. Alternatively, computer 24 can transmit the fabrication instructions in terms of the original system of coordinates as provided by the computer object data, in which case the transformation of coordinates is executed by the circuit of controller 20.

Figure 3A:
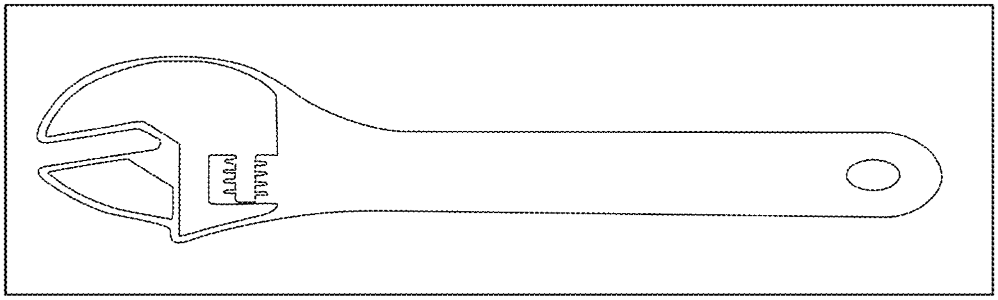
FIGS. 3A and 3B are schematic illustrations demonstrating coordinate transformations according to some embodiments of the present invention.
Figure 3B:
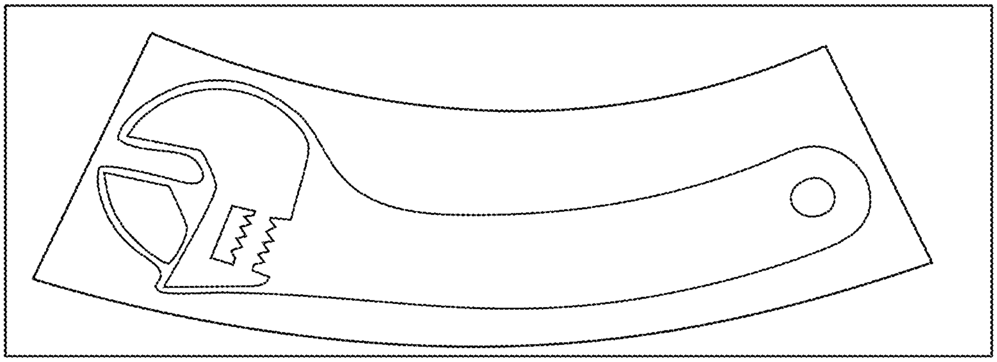

The transformation of coordinates allows three-dimensional printing over a rotating tray. In conventional three-dimensional printing, the printing heads reciprocally move above a stationary tray along straight lines. In such conventional systems, the printing resolution is the same at any point over the tray, provided the dispensing rates of the heads are uniform. Unlike conventional three-dimensional printing, not all the nozzles of the head points cover the same distance over tray 12 during at the same time. The transformation of coordinates is optionally and preferably executed so as to ensure equal amounts of excess material at different radial positions. Representative examples of coordinate transformations according to some embodiments of the present invention are provided in FIGS. 3A-B, showing three slices of an object (each slice corresponds to fabrication instructions of a different layer of the objects), where FIG. 3A illustrates a slice in a Cartesian system of coordinates and FIG. 3B illustrates the same slice following an application of a transformation of coordinates procedure to the respective slice.

Typically, controller 20 controls the voltage applied to the respective component of the system 10 based on the fabrication instructions and based on the stored program instructions as described below.

Generally, controller 20 controls printing heads 16 to dispense, during the rotation of tray 12, droplets of building material in layers, such as to print a three-dimensional object on tray 12.

System 10 optionally and preferably comprises a solidification system 18, which may optionally and preferably comprise one or more radiation sources, which can be, for example, an ultraviolet or visible or infrared lamp, or other sources of electromagnetic radiation, or electron beam source, depending on the modeling material being used. Radiation source can include any type of radiation emitting device, including, without limitation, light emitting diode (LED), digital light processing (DLP) system, resistive lamp and the like. Solidification system 18 serves for solidifying (e.g., curing) the modeling material. In various exemplary embodiments of the invention the operation of solidification system 18 is controlled by controller 20 which may activate and deactivate solidification system 18 and may optionally also control the amount of radiation generated by solidification system 18.

In some embodiments of the invention, system 10 further comprises one or more leveling devices 32 which can be manufactured as a roller or a blade. Leveling device 32 serves to straighten the newly formed layer prior to the formation of the successive layer thereon. In some optional embodiments, leveling device 32 has the shape of a conical roller positioned such that its symmetry axis 34 is tilted relative to the surface of tray 12 and its surface is parallel to the surface of the tray. This embodiment is illustrated in the side view of system 10 (FIG. 1C).

The conical roller can have the shape of a cone or a conical frustum.

The opening angle of the conical roller is preferably selected such that is a constant ratio between the radius of the cone at any location along its axis 34 and the distance between that location and axis 14. This embodiment allows roller 32 to efficiently level the layers, since while the roller rotates, any point p on the surface of the roller has a linear velocity which is proportional (e.g., the same) to the linear velocity of the tray at a point vertically beneath point p. In some embodiments, the roller has a shape of a conical frustum having a height h, a radius $R_1$ at its closest distance from axis 14, and a radius $R_2$ at its farthest distance from axis 14, wherein the parameters h, $R_1$ and $R_2$ satisfy the relation $R_1/R_2=(R-h)/h$ and wherein R is the farthest distance of the roller from axis 14 (for example, R can be the radius of tray 12).

The operation of leveling device 32 is optionally and preferably controlled by controller 20 which may activate and deactivate leveling device 32 and may optionally also control its position along a vertical direction (parallel to axis 14) and/or a radial direction (parallel to tray 12 and pointing toward or away from axis 14.

In some embodiments of the present invention printing heads 16 are configured to reciprocally move relative to tray along the radial direction r. These embodiments are useful when the lengths of the nozzle arrays 22 of heads 16 are shorter than the width along the radial direction of the working area 26 on tray 12. The motion of heads 16 along the radial direction is optionally and preferably controlled by controller 20.

Some optional embodiments contemplate the fabrication of an object by dispensing different materials from different dispensing heads. These embodiments provide, inter alia, the ability to select materials from a given number of materials and define desired combinations of the selected materials and their properties. According to the present embodiments, the spatial locations of the deposition of each material with the layer is defined, either to effect occupation of different three-dimensional spatial locations by different materials, or to effect occupation of substantially the same three-dimensional location or adjacent three-dimensional locations by two or more different materials so as to allow post deposition spatial combination of the materials, e.g. digital combination of materials within the layer, thereby to form a third material at the respective location or locations.

Any post deposition combination or mix of modeling materials is contemplated. For example, once a certain material is dispensed it may preserve its original properties. However, when it is dispensed simultaneously with another modeling material or other dispensed materials which are dispensed at the same or nearby locations, a composite material having a different property or properties to the dispensed materials is formed.

The present embodiments thus enable the deposition of a broad range of material combinations, and the fabrication of an object which may consist of multiple different combinations of materials, in different parts of the object, according to the properties desired to characterize each part of the object.

Exemplified embodiments for the printing head 16 are illustrated in FIGS. 2A-2C. These embodiments can be employed for any of the AM systems described above, including, without limitation, system 110 and system 10.

FIGS. 2A-B illustrate a printing head 16 with one (FIG. 2A) and two (FIG. 2B) nozzle arrays 22. The nozzles in the array are preferably aligned linearly, along a straight line. In embodiments in which a particular printing head has two or more linear nozzle arrays, the nozzle arrays are optionally and preferably parallel to each other.

When a system similar to system 110 is employed, all printing heads 16 are optionally and preferably oriented along the indexing direction with their positions along the scanning direction being offset to one another.

When a system similar to system 10 is employed, all printing heads 16 are optionally and preferably oriented radially (parallel to the radial direction) with their azimuthal positions being offset to one another. Thus, in these embodiments, the nozzle arrays of different printing heads are not parallel to each other but are rather at an angle to each other, which angle being approximately equal to the azimuthal offset between the respective heads. For example, one head can be oriented radially and positioned at azimuthal position $\varphi_1$, and another head can be oriented radially and positioned at azimuthal position $\varphi_2$. In this example, the azimuthal offset between the two heads is $\varphi_1$-$\varphi_2$, and the angle between the linear nozzle arrays of the two heads is also $\varphi_1$-$\varphi_2$. In some embodiments, two or more printing heads can be assembled to a block of printing heads, in which case the printing heads of the block are typically parallel to each other. A block including several heads 16*a*, 16*b*, 16*c* is illustrated in FIG. 2C.

Figure 4:
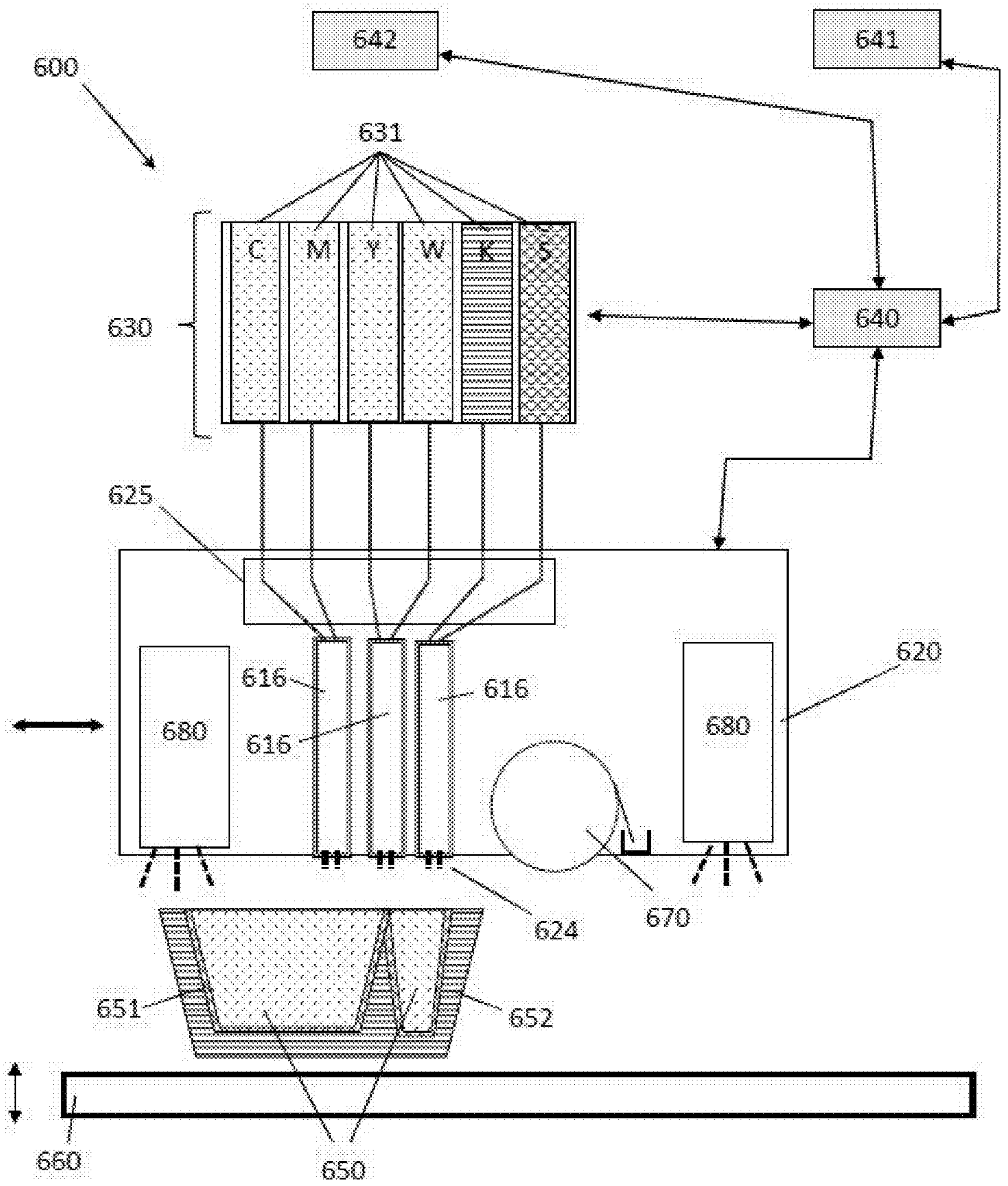
FIG. 4 is a schematic illustration of an AM full color system according to some embodiments of the invention.

FIG. 4 is a schematic illustration of an AM full color system in accordance with some embodiments of the invention. Typically, AM system 600 (i.e. apparatus) is a three-dimensional inkjet printing apparatus, including a building material supply system or apparatus 630 and printing block or frame 620 that scans a building surface or tray 660. In one embodiment of the invention, building material supply system 630 comprises six liquid building material supply cartridges, for supplying six different liquid building materials to AM system 600, via material reservoir 625. In order to print object 650, cartridge "C" supplies cyan colored modeling material, cartridge "M" supplies magenta colored modeling material, cartridge "Y" supplies yellow colored modeling material, cartridge "W" supplies white modeling material, and cartridge "K" supplies black colored modeling material. Cartridge "S" supplies a soft material that can be used to form intermediate structure 651 and/or to form part of a support structure needed to print three-dimensional object 650. According to some embodiments of the invention, instead of black colored modeling material, cartridge "K" supplies black colored flexible material for printing at least part of peelable sacrificial structure 652 and some regions of the object itself, as required. The soft material to form intermediate structure 651 may be selected to have a paste-like consistency and optionally may also be selected to be washable.

In some embodiments of the invention, printing block 620 comprises at most three inkjet printing heads 616 for selectively depositing building material on tray 660. Each printing head 616 receives building materials from two of the six cartridges of supply apparatus 630, via material reservoir 625. Each printing head has two linear arrays of nozzles 624, as depicted for example in FIG. 2B, and each nozzle array is dedicated to dispensing a different building material supplied by supply apparatus 630. Optionally, two or more nozzle arrays may be dedicated to dispensing the same material.

Typically, printing block 620 additionally comprises a leveling device 670 for leveling a printed layer and one or more hardening devices 680 for hardening the printed layer.

Printing block 620 is preferably operative to reciprocally move over tray 660, which serves as the working surface. Tray 660 is positioned horizontally. According to the common conventions, an X-Y-Z Cartesian coordinate system is selected such that the X-Y plane is parallel to tray 660. In use in some exemplary embodiments, printing block 620 moves in a scanning direction, which is referred to herein as the X direction, and printing heads 616 selectively dispense building material in a predetermined configuration in the course of their passage over tray 660. The passage of printing heads 616 is followed by hardening, e.g. curing of the building material(s) with one of hardening devices 680. In the reverse passage of printing block 620, back to its starting point for the layer just deposited, an additional dispensing of building material may be carried out, according to predetermined configuration, and the other of the hardening devices 680 is operated. Optionally, both hardening devices are operated in either or both directions.

In the forward and/or reverse passages of printing block 620, the layer formed may be straightened by leveling device 670, which preferably follows in the path of printing heads 616 in their forward and/or reverse movement. Once printing block 620 returns to its starting point along the X direction, it may move to another position along an indexing direction, referred to herein as the Y direction, and continue to build the same layer by reciprocal movement along the X direction. Alternatively, printing block 620 may move in the Y direction between forward and reverse movements or after more than one forward-reverse movement. The series of scans performed by the dispensing heads to complete a single layer is referred to herein as a single scan cycle.

Once the layer is completed, tray 660 is lowered in the Z direction to a predetermined Z level, according to the desired thickness of the layer subsequently to be printed. The procedure is repeated to form 3D object 650 in a layer-wise manner.

A control unit 640 controls operation of the elements included in building supply system 630 as well as in printing block 620. Control unit 640 typically includes an electronic circuit configured to perform the controlling operations. Control unit 640 preferably communicates with a processor 641 which transmits digital data pertaining to fabrication instructions based on computer object data, e.g., a CAD configuration represented on a computer readable medium in a form of a Standard Tessellation Language (STL) format or the like. Typically, processor 641 includes a memory unit and/or memory capability for storing computer object data and for storing data pertaining to fabrication instructions based on computer object data. Typically, control unit 640 controls the elements of printing block 620, e.g., the voltage applied to each printing head 616 or each nozzle array 624, the hardening units 680 and roller 670, as well as the supply of building materials from each of the six cartridges 631 in building material supply apparatus 630.

Once the manufacturing data is loaded to control unit 640, AM system 600 may operate without user intervention. In some embodiments, control unit 640 receives additional input from the operator, e.g., using data processor 641 or using a user interface 642 communicating with unit 640.

Figure 5A:
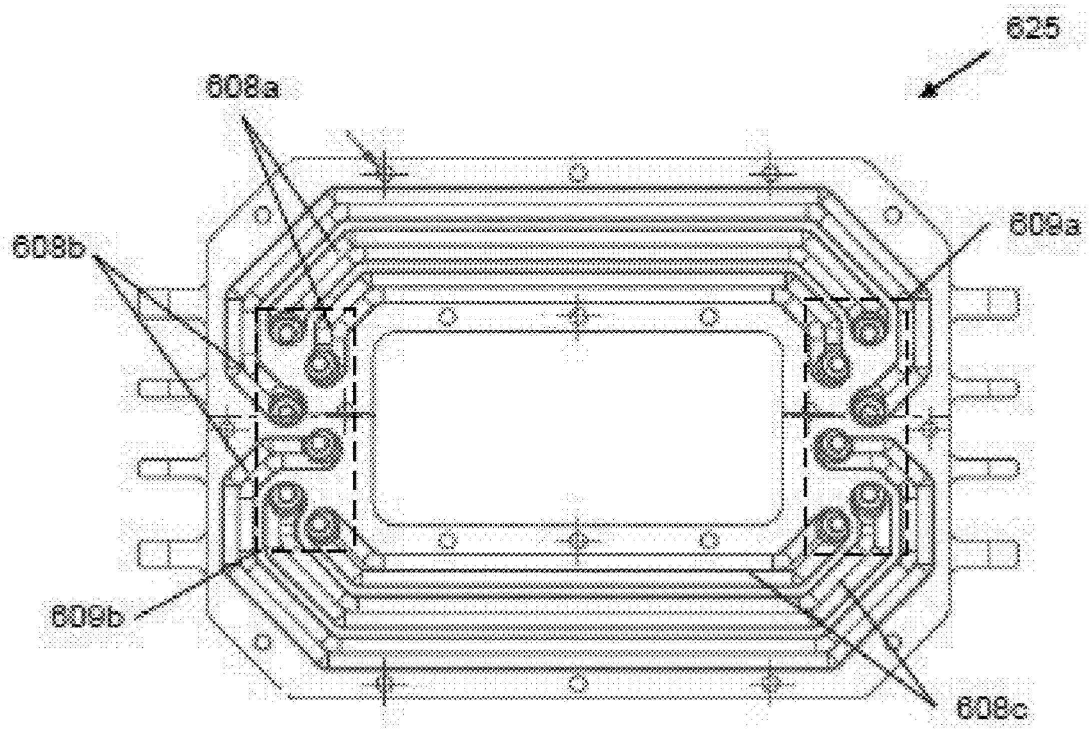
FIGS. 5A and 5B are exemplary top and perspective views of a printing block of an AM system according to some embodiments of the present invention.
Figure 5B:
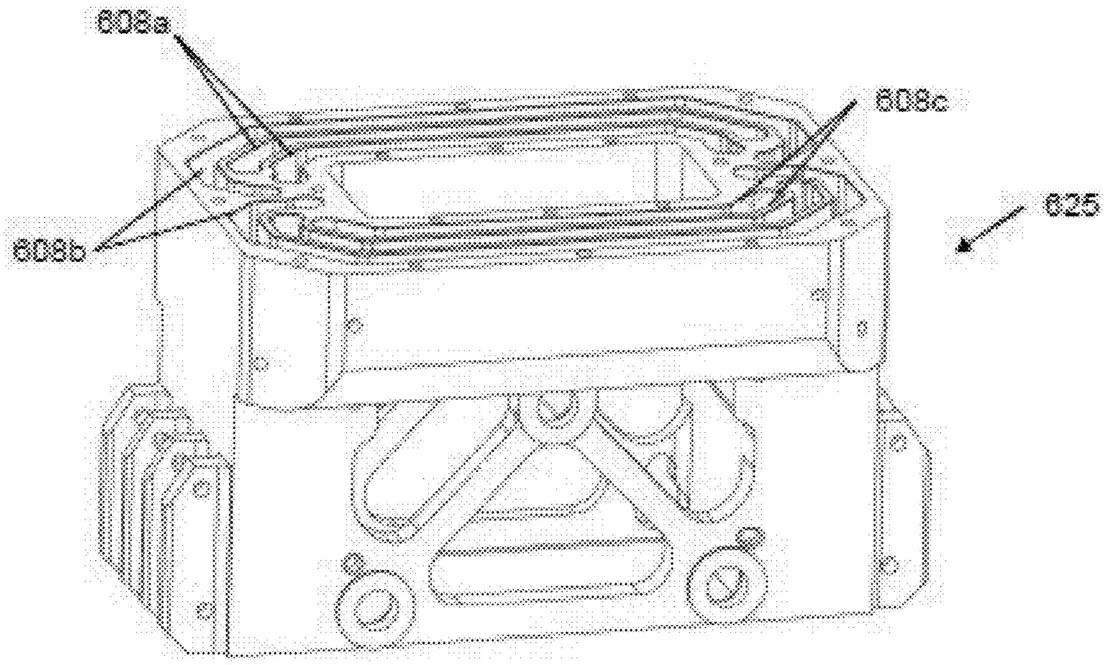

FIGS. 5A and 5B are exemplary top and perspective views of a material reservoir of an AM system in accordance with some embodiments of the present invention. Material reservoir 625 includes a plurality of separate compartments 608 for directing building material from supply system 630 to printing heads 616 (see FIG. 4). Each compartment 608 of material reservoir 625 may be shaped as a defined channel with one or more outlets, through which material is introduced into a printing head 616. Optionally outlets are positioned at each end 609 of compartments 608. According to some embodiments of the present invention, compartments 608*a* are designed to supply two different building materials to two distinct arrays of nozzles in a first printing head 616, compartments 608*b* are designed to supply two different building materials to two distinct arrays of nozzles in a second printing head 616, and compartments 608*c* are designed to supply two different building materials to two distinct arrays of nozzles in a third printing head 616. Typically, the first and second arrays of a single print head 616 do not overlap and both arrays may be simultaneously used for printing two different building materials.

In one exemplary configuration, reservoir 625 routes modeling material in four different colors, plus soft material and a flexible black material. The six different building materials are therefore deposited, i.e. dispensed via three dual nozzle array printing heads 616, and a full-color 3D object 650 is produced together with a peelable flexible sacrificial structure, which is easy to remove, for instance at home or in an office environment.

Figure 6:
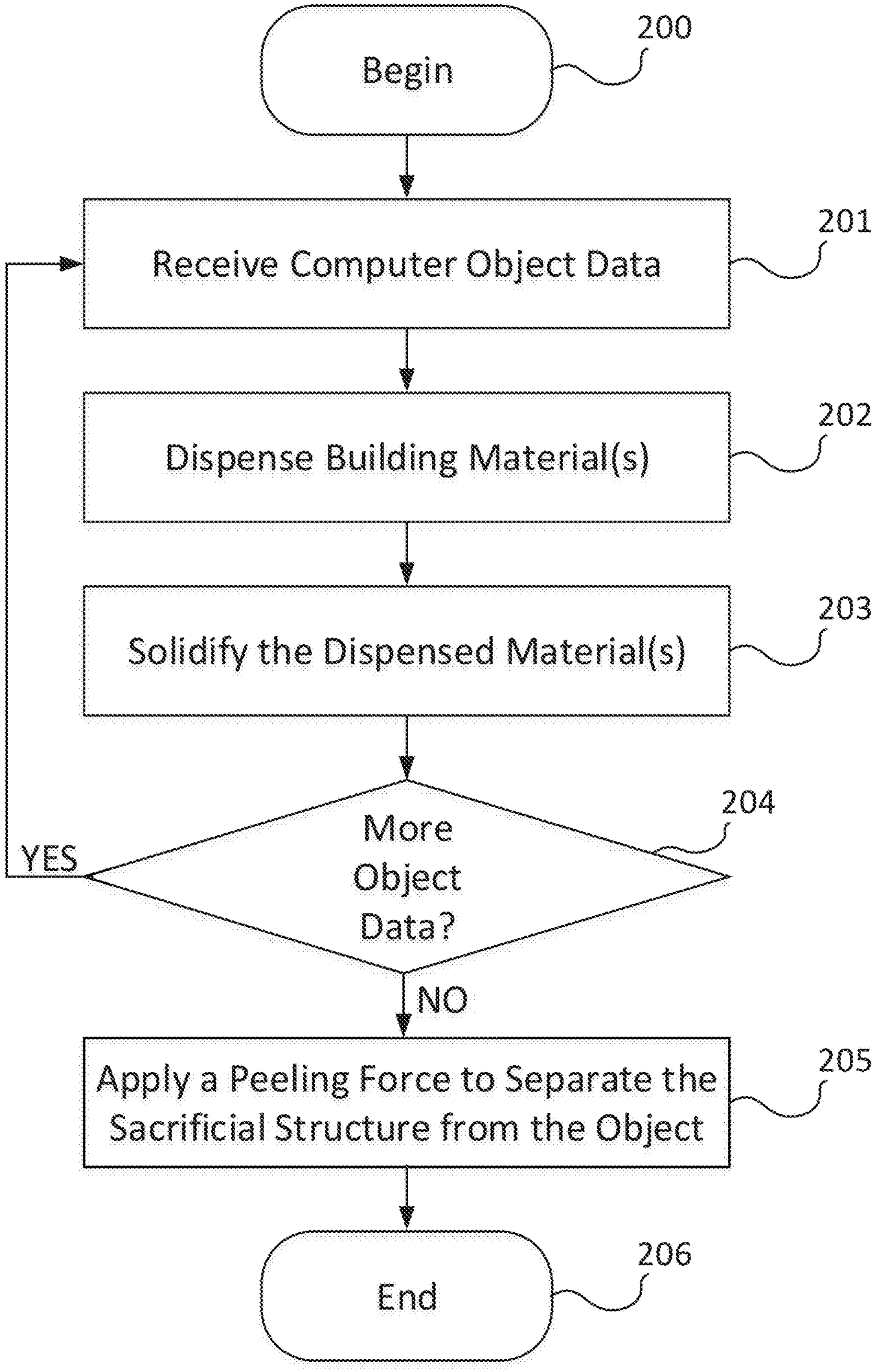
FIG. 6 is a flowchart diagram of the method according to various exemplary embodiments of the present invention.

FIG. 6 is a flowchart diagram of the method according to various exemplary embodiments of the present invention. The method can be used for fabricating any object, including, without limitation, an artificial medical structure (e.g. a dental structure), a mold, and a housing for an electronic device, with a peelable sacrificial structure.

The method begins at 200 and optionally and preferably proceeds to 201 at which computer object data in any of the aforementioned formats are received. The method can proceed to 202 at which a layer of building material is dispensed. The building material can be a modeling material, a flexible material and/or a soft material. In some embodiments of the present invention the method selectively dispenses for a particular layer, one or more regions of modeling materials, one or more regions of flexible material and one or more regions of soft material. The modeling material is preferably dispensed in a configured pattern corresponding to the shape of the object and in accordance with the computer object data.

The method optionally and preferably proceeds to 203 at which the dispensed building material is solidified. The type of solidification process depends on the type of dispensed materials. For example, when the building material is UV curable, the solidification comprises applying UV radiation, when the building material is curable by other radiation (e.g., infrared or visible light), the solidification comprises applying radiation at a wavelength that cures the building material.

Operations 202 and 203, and in some embodiments also 201, are preferably executed sequentially a plurality of times so that a plurality of layers are sequentially dispensed and solidified and the object data or defined block of layers is complete 204. This is illustrated in FIG. 6 as a loop back arrow pointing from operation 204 to operations 201. Optionally, operation 204 may loop back to operation 202. The layers are dispensed to form a three-dimensional object mainly comprising solid modeling materials (e.g. 51-100%), a sacrificial structure mainly comprising a flexible material (e.g. 80-100%), and an intermediate structure mainly comprising a soft material (e.g. 80-100%). In some embodiments of the present invention the method dispenses digital material for at least one of the layers.

Once all the layers are formed, the method preferably proceeds to 205 at which a peeling force is applied to the sacrificial structure to separate the sacrificial structure from the three-dimensional object, preferably in its entirety, together with part or all of the soft material used as an intermediate structure. Preferably, the peeling is executed in dry environment. According to some of any of the embodiments of the invention described herein, the magnitude of the peeling force is from about 1N to about 20N, e.g., about 5N or about 10N or about 15N. Optionally, once the sacrificial structure has been removed, the 3D object is washed, preferably with an environmental friendly liquid (e.g. water), to remove remnants of soft material on its surface.

The method ends at 206.

The removal of the sacrificial structure by peeling according to some embodiments of the present invention is unlike conventional techniques in which water-jet or other chemical methods, such as dissolution in a solvent, with or without heating are employed.

The present inventors found that in many cases conventional removal of support may involve hazardous materials, manual labor and/or special equipment requiring trained personnel, protective clothing and expensive waste disposal. The present inventors realized that the dissolution process can be limited by diffusion kinetics and may require very long periods of time. The present inventors also realized that in some cases post-processing is necessary to remove traces of residual substances, such as support material or mixtures of hardened modelling and support materials, from the surfaces of the object. The present inventors further realized that removal that requires elevated temperatures can also be problematic since it may be inconvenient and requires special equipment.

In a search for a solution to these problems, the present inventors devised a fabrication technique that facilitates removal of the sacrificial structure by peeling, without the need for water jets, chemical processes and/or elevated temperatures. Effective removal of the sacrificial structure by peeling can be ensured in more than one way.

In some embodiments of the present invention, the sacrificial structure comprises a stack of sacrificial layers made of a flexible material. Any flexible material, for instance an elastomeric material, can be employed. A representative example of an elastomeric material suitable for use as an elastomeric material according to some embodiments of the present invention is provided hereinbelow and is further detailed in International Patent Application entitled "ADDITIVE MANUFACTURING OF RUBBER-LIKE MATERIALS" claiming priority to U.S. Provisional Patent Application No. 62/342,970 filed May 29, 2016, the contents of which are incorporated herein by reference in their entirety.

Figure 7A:
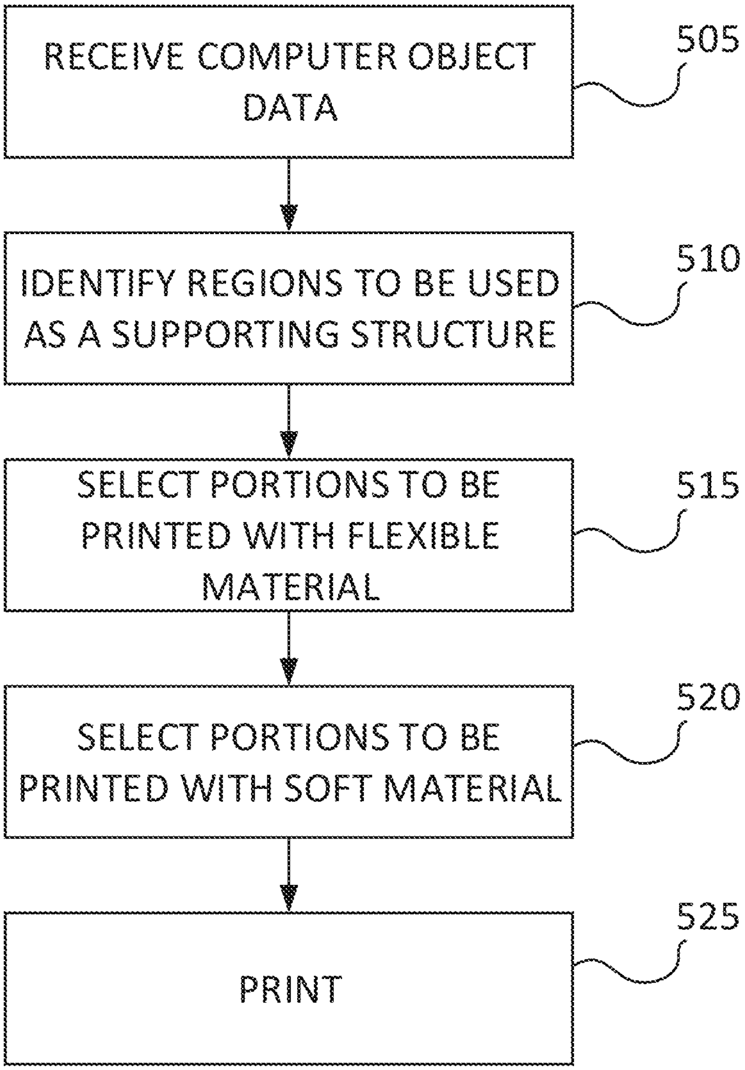
FIG. 7A is a simplified flow chart of an exemplary method for supporting a printed object with a combination of support materials, according to some embodiments of the present invention.

FIG. 7A is a simplified flow chart of an exemplary method for supporting a printed object with a combination of soft material and flexible material, according to some embodiments of the present invention. According to some example embodiments, a support structure for an object printed by a three dimensional inkjet additive manufacturing system may include two different materials. One material may be a flexible material, e.g. an elastomeric material, that is configured to form a peelable structure to be peeled off the object at the end of the printing process as described herein, and the other material may be a soft material that may be used to provide an intermediate soft structure between the object and the peelable material as well as to fill in difficult-to-reach volumes, e.g. partially enclosed volumes from which it is not possible to peel away a sacrificial structure.

Optionally, the soft material may be water soluble, e.g. a gel-like photopolymer that can be removed by immersing in water and without any dedicated equipment. Optionally, the soft material may be support material SUP705™, SUP706™ or SUP707™ or a combination of these, all by Stratasys® Ltd., Israel. Optionally, the soft material may have a paste-like consistency, and may optionally also be selected to be washable.

In some example embodiments, the flexible peelable material may be formed for example by TangoPlus™ FLX 930 (Shore 27A), TangoBlackPlus™ FLX 980 (Shore 27A), TangoGray™ FLX950 (Shore 70A), TangoBlack™ FLX973 (Shore 70A), Agilus30™ Clear FLX935 (Shore 30A), or Agilus30™ Black FLX985 (Shore 30A), or combinations thereof, all by Stratasys® Ltd., Israel. Alternatively or additionally, the flexible peelable material may be formed by a dedicated formula, for example a digital combination of SUP705™, SUP706™ and/or Vero™ materials, all by Stratasys® Ltd., Israel.

According to some example embodiments, the method begins with computer object data being received (505). The computer object data may include regions to be printed predominantly with modeling material(s) to form a 3D object and regions to be printed predominantly with other building material(s), e.g. flexible and/or soft materials, to form a supporting structure. The regions to be used as a supporting structure may be identified (510) and differentiated from regions to be printed with model material. Some portions of the supporting structure can be printed with the flexible peelable e.g. elastomeric material (515), and other portions of the supporting structure may be selected to be printed with the soft material (520). Based on the selection, the printing is executed (525). After printing, a user may peel off the flexible material and optionally wash-off or immerse the object with any remnants of soft material still attached to it in water to dissolve the remaining soft material and fully provide the clean printed object.

In some example embodiments, the soft material is printed to fill deep and narrow holes or any other difficult-to-reach and/or hidden volume/s (e.g. partially enclosed volumes) that may be defined by the object structure. The soft material may also be used to protect delicate features of the 3D object that may be susceptible to breaking if a pulling or peeling force was applied in their vicinity. In some example embodiments, the soft material provides an intermediate structure between the printed object and the sacrificial structure made of a flexible material, to ease separation of the sacrificial structure from the object. Thickness of the soft material may be for example 1 to 10 voxels, 1 to 25 voxels, 1 to 50 voxels, or 10 to 200 microns, 10 to 500 microns, or 10 to 1000 microns. Optionally, thickness of the soft material may be a function of orientation. In some example embodiments, a separation layer of soft material may be defined to be thinner in a Z direction (vertical direction) as compared to a horizontal separation layer. Thickness of the separation layer may also be a function of the printer attributes as well as physical, chemical and/or other properties of one or more of the materials used for building the object.

The mechanical properties of the peelable flexible material depend on its thickness and geometry. Optionally, thickness of the peelable flexible material may be defined based on a desired mechanical property. For example, a thinner layer of peelable material may be more flexible and may be easier to peel off than a thicker layer. Optionally, a flexural modulus of at least a portion of the sacrificial structure formed from the peelable flexible material is 2000 MPa to 4000 MPa. Optionally, a pattern such as a grid may be defined with a combination of peelable flexible material and soft material may be defined to achieve a desired mechanical property.

Figure 7B:
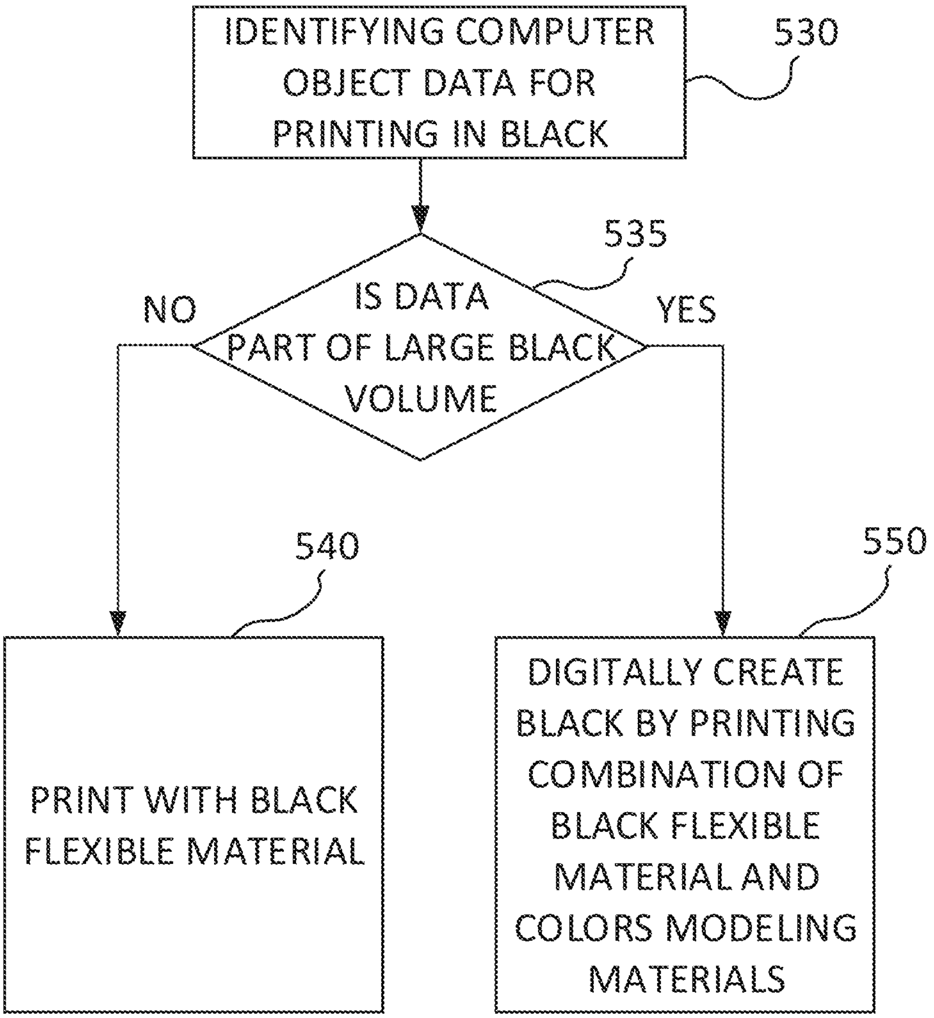
FIG. 7B is a simplified flow chart of an exemplary method for color printing with an AM system, according to some embodiments of the present invention.

FIG. 7B is a simplified flow chart of an exemplary method for color printing with an AM system, according to some embodiments of the present invention. Optionally, an AM system may not include a black model (i.e. strong) material and may instead use a black flexible material. The method begins with identifying computer object data corresponding to regions of the 3D object to be printed in black (530). According to some example embodiments, a black section or element in the printed object may be printed with a combination of different colored model material (e.g. CMY), with the black flexible material alone, or a combination of colored model material and black flexible material. In some example embodiments, a decision between printing a black region with the black flexible material alone or with a combination of model materials is made. Optionally, if the data for printing in black is part of a large volume within the object that is designated to be printed in black (535), that region may be printed with different colored model materials that are digitally combined to create a black model material, optionally in combination with an amount of black flexible material (550). Otherwise, when the data for printing in black is part of a small volume, that region is preferably printed with the black flexible material to obtain a true black color and reduce the consumption of modeling materials for this purpose (540). For fine external details or structures at the object surface, a combination of modeling materials may be preferred to maintain the surface properties (e.g. thin wall).

Figure 8A:
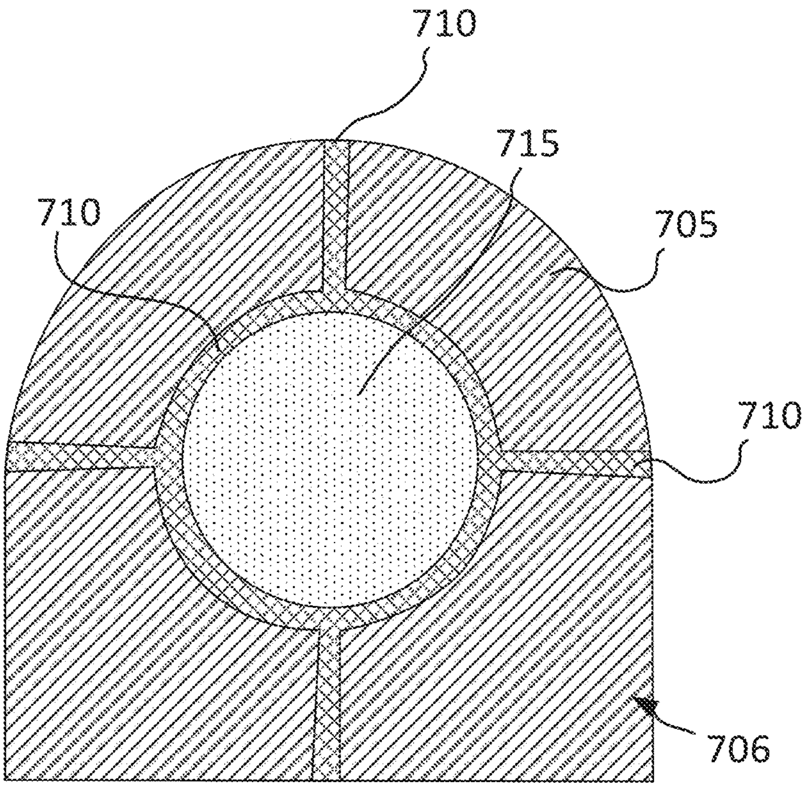
FIGS. 8A and 8B are schematic illustrations of two different configurations for printing an object with a peelable flexible material and an intermediate soft structure, both according to some embodiments of the present invention.
Figure 8B:
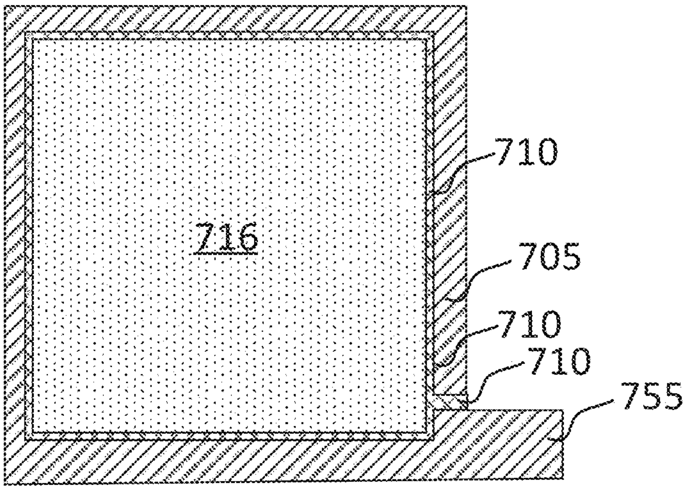

FIGS. 8A and 8B are schematic illustrations of two different configurations for printing objects with a peelable flexible material and an intermediate soft structure, both according to some embodiments of the present invention. The peelable flexible material is for example an elastomeric material, forming a sacrificial structure. An object 715 or 716 is printed in layers and is enclosed within a sacrificial structure 706 formed by soft material 710 and peelable flexible material 705 during the layer building process. In some example embodiments, portions that are printed with peelable flexible material 705 may be split. In some examples, the split may be by division of the sacrificial structure into a plurality of sections to ease removal of the peelable material 705, e.g. by separation between sections of peelable material 705 with strips of soft material 710. In other examples, the split may be formed or additionally formed by breaking, e.g. separating a surface of peelable flexible material 705 with strips of soft material 710 that are exposed, i.e. visible at the surface of the sacrificial structure, for further ease of removal. Referring now to FIG. 8B of object 716, in some example embodiments, a tab 755 may be selectively formed with the peelable flexible material 705 to allow easy grasping of the flexible material to initiate its removal. Optionally, peelable flexible material 705 may be split near tab 755, e.g. by soft material 710 which may be exposed at the surface of the split.

Figure 9A:
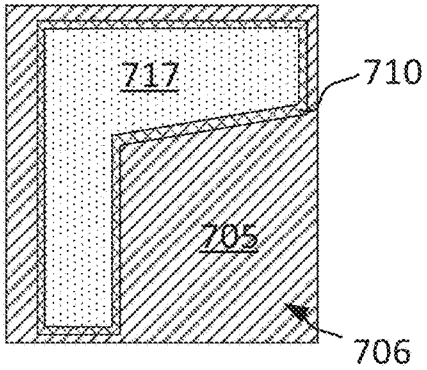
FIGS. 9A and 9B are schematic illustrations of two different configurations for printing an object including large support volumes, the object surrounded with a peelable flexible material and an intermediate soft structure, all according to some embodiments of the present invention.
Figure 9B:
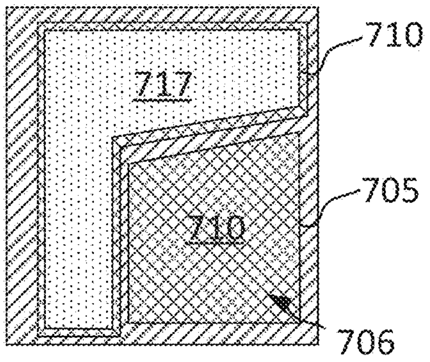

FIGS. 9A and 9B are schematic illustrations of two different configurations for printing an object including large support volumes, the object surrounded with a peelable flexible material 705 and an intermediate structure of soft material 710, all according to some embodiments of the present invention. When a large volume of support, i.e. sacrificial structure 706 is applied to build object 717, the chunk of peelable flexible material 705 in sacrificial structure 706 may be difficult to remove at the end of the printing process. In some example embodiments, soft material 710 may be applied to fill a portion of volume 706. Optionally, the soft material 710 may be encapsulated with peelable flexible material 705. Adding soft material 710 softens volume 706 so that it may be more easily removed. Furthermore, by encapsulating soft material 710 with peelable flexible material 705, volume 706 may be removed while maintaining soft material 710 contained in peelable flexible material 705 and thereby avoiding any potential mess or remnants that may occur with removal of soft material 710, as well as improving mechanical properties of the printed object 717.

Figure 10A:
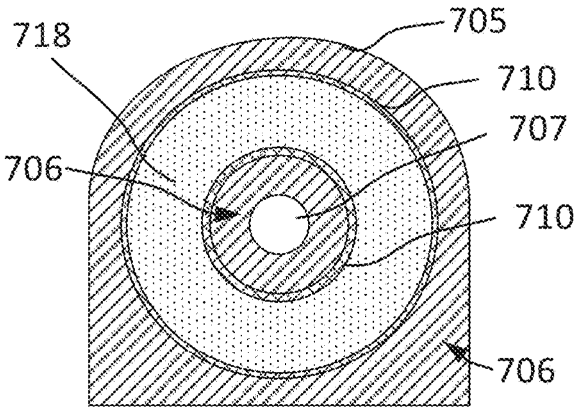
FIGS. 10A and 10B are schematic illustration of an object with a closed loop geometry printed together with a peelable flexible material and an intermediate soft structure, according to some embodiments of the present invention.
Figure 10B:
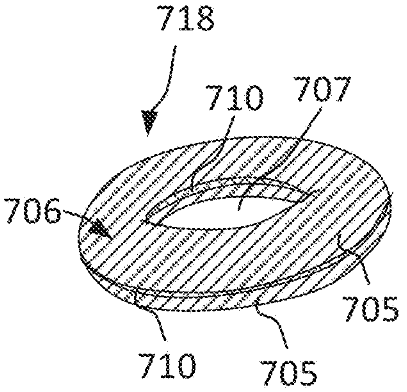

FIGS. 10A and 10B are schematic illustrations of an object 718 having a closed loop geometry and printed together with a sacrificial structure 706 comprising a peelable flexible material and an intermediate soft structure, according to some embodiments of the present invention. FIG. 10A is a cross-section of an exemplary closed loop object printed vertically relative to the tray or printing surface, and FIG. 10B is a schematic 3D image of a closed loop object printed horizontally relative to the tray or printing surface. In both cases, when printing an object 718 with closed loop geometry and a hollow section 707, the sacrificial structure 706 required to form said object may be difficult to remove i.e. peel away upon completion of printing. In that case, in order to ease the peeling process, peelable flexible material 705 may be defined to be printed with a split of soft material along at least part of an inner and/or outer perimeter of object 718, from which peeling flexible material 705 may be initiated after the printing process. Soft material 710 may be exposed at the splits and may provide for separating peeling flexible material 705 at the split, (e.g. as shown in FIG. 10B). The split may make it easier to remove flexible material 705 from an object 718 that has a closed looped geometry.

Figure 11A:
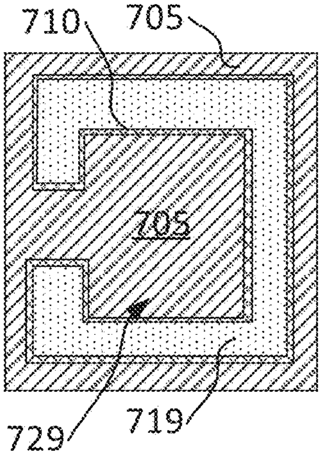
FIGS. 11A, 11B and 11C are schematic illustrations of three different configurations for printing an object including a hole, the object surrounded with a peelable flexible material and an intermediate soft structure, all according to some embodiments of the present invention.
Figure 11B:
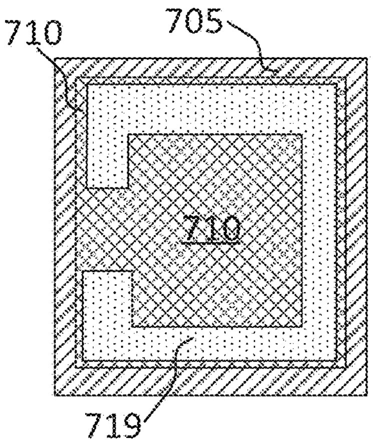
Figure 11C:
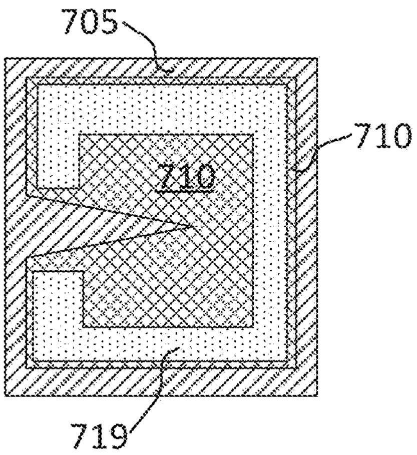

FIGS. 11A, 11B and 11C are schematic side-view illustrations of three different configurations for printing an object including a hole, the object surrounded with a sacrificial structure formed of a peelable flexible material and an intermediate soft structure, all according to some embodiments of the present invention. In some example embodiments, the geometry of an object 719 may define a cavity 729 with a narrow opening. Building object 719 as shown in FIG. 11A would include a chunk of peeling flexible material 705 within cavity 729. In this configuration, it may be difficult to peel away flexible material 705 from cavity 729. Alternatively, object 719 may be defined to be printed with soft support material 710 filling cavity 729 as shown in FIG. 11B or with soft support material 710 filling a substantial portion of cavity 729 and flexible material 705 partially penetrating into cavity 729 with tapering as shown in FIG. 11C so that flexible material 705 may be easily removed. In the configuration shown in FIG. 11C, cleaning time may be reduced based on reduction in the volume of soft support material 710 as compared to that shown in FIG. 11B.

Figure 12A:
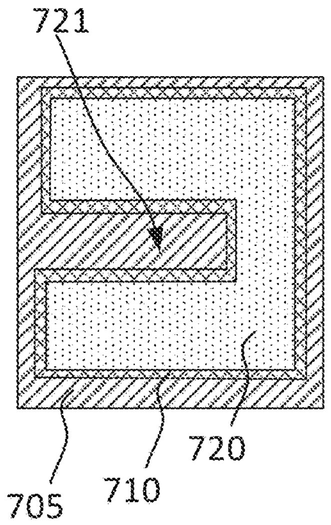
FIGS. 12A, 12B and 12C are schematic illustrations of three different configurations for printing an object including a high ratio aspect socket, the object surrounded with a peelable flexible material and an intermediate soft structure, all according to some embodiments of the present invention.
Figure 12B:
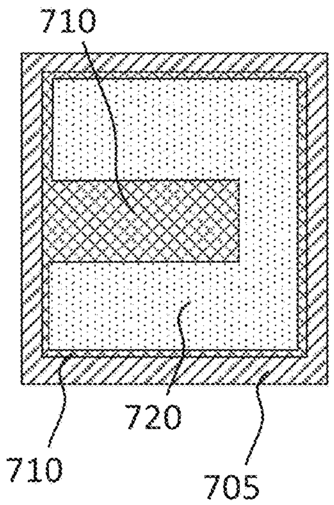
Figure 12C:
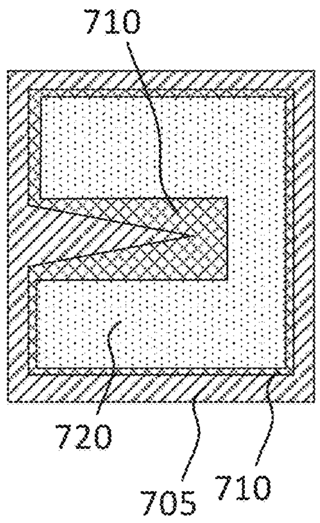

FIGS. 12A, 12B and 12C are schematic illustrations of three different configurations for printing an object including a high ratio aspect cavity, the object surrounded with a sacrificial structure comprising peelable flexible material and an intermediate soft structure, all according to some embodiments of the present invention. Object 720 includes a high ratio aspect cavity 721. In one configuration, cavity 721 may be filled with flexible material 705 during the printing process as shown in FIG. 12A. In some example embodiments, removing flexible material 705 at the termination of the printing process based on the configuration shown in FIG. 12A may be difficult. Due to the geometry of cavity 721, shear forces applied while pulling on flexible material 705 may break flexible material 705, making it difficult to fully separate object 720 from the sacrificial structure. Alternatively, in some example embodiments, cavity 721 may be defined to be completely filled with soft material 710 as shown in FIG. 12B or partially filled with soft material 710 as shown in FIG. 12C. In the example shown in FIG. 12C, object 720 is printed with flexible material 705 penetrating into cavity 721 with a tapered geometry for easy separation from object 720 at the end of the printing process.

Figure 13A:
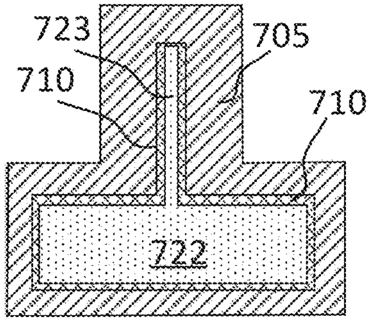
FIGS. 13A, 13B and 13C are schematic illustrations of three different configurations for printing an object including a delicate feature with surrounding flexible material forming a sacrificial structure, all according to some embodiments of the present invention.
Figure 13B:
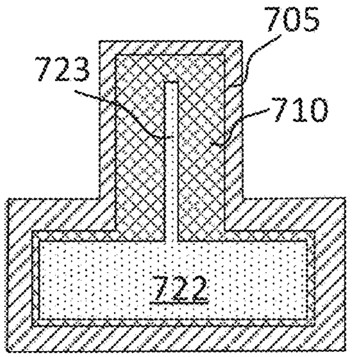
Figure 13C:
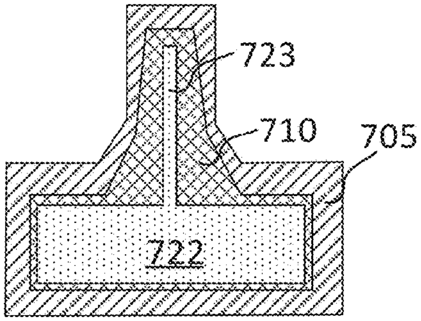
Figure 14D:
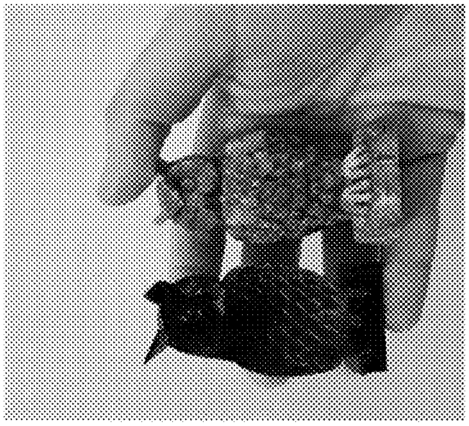
FIGS. 14A, 14B, 14C and 14D show an exemplary peeling process of a black elastomeric sacrificial structure from a colored model, according to some embodiments of the present invention.
Figure 14C:
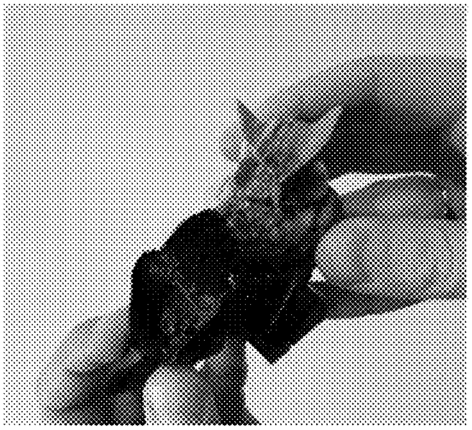
Figure 14B:
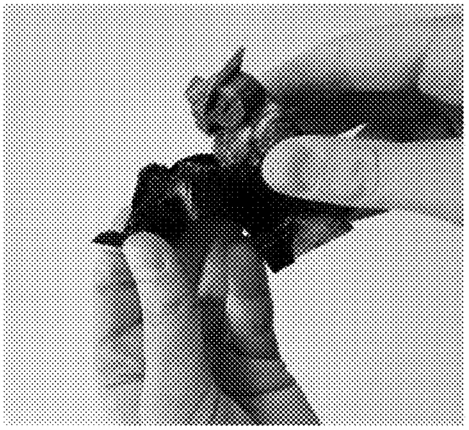
Figure 14A:
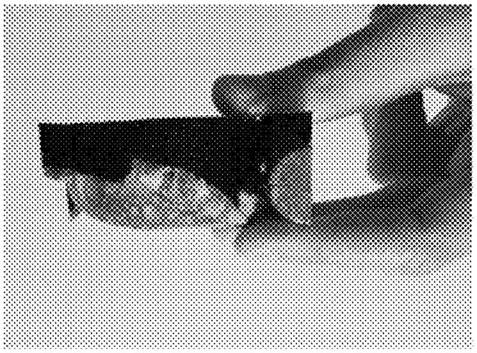

FIGS. 13A, 13B and 13C are schematic illustrations of three different configurations for printing an object including a delicate feature with surrounding flexible material forming a sacrificial structure, all according to some embodiments of the present invention. An object 722 may include a delicate feature 723 or more than one delicate feature. In some example embodiments, it is desirable to pad delicate feature 723 of object 722 with a thicker layer of soft material 710 to avoid breaking delicate feature 723 while pulling on flexible material 705 to expose object 722 at the end of the printing process.

In some example embodiments, a layer of soft material 710 that is substantially a same thickness around object 722 as shown in FIG. 13A may not be enough to protect delicate feature 723. Alternatively, in some example embodiments, delicate feature 723 may be identified prior to printing and a thicker layer of soft material 710 may be selected to cover delicate feature 723 as shown in FIGS. 13B and 13C. Thickness and shape of the layer of soft material 710 around delicate feature 723 may be customized to provide adequate protection while conserving the amount of material needed to provide the protection, and conserving cleaning time associated with removing soft material 710. An optional configuration with less support material/s (e.g. flexible peelable material and/or soft material) is shown for example in FIG. 13C.

Following is a description of an elastomeric material suitable for use as a flexible material according to some embodiments of the present invention.

The elastomeric formulation as described herein comprises an elastomeric material. Optionally and preferably the elastomeric formulation also comprises silica particles.

The phrase "elastomeric material" describes a solidifiable (e.g., curable) material, as defined herein, which following a solidification (for example, upon exposure to energy, such as, but not limited to, curing energy) acquires properties of an elastomer (a rubber, or rubber-like material).

Elastomeric materials typically comprise one or more polymerizable (curable) groups, which undergo polymerization upon exposure to a suitable curing energy, linked to a moiety that confers elasticity to the polymerized and/or cross-linked material. Such moieties typically comprise alkyl, alkylene chains, hydrocarbon, alkylene glycol groups or chains (e.g., oligo or poly(alkylene glycol) as defined herein, urethane, oligourethane or polyurethane moieties, as defined herein, and the like, including any combination of the foregoing, and are also referred to herein as "elastomeric moieties".

An elastomeric mono-functional curable material according to some embodiments of the present invention can be a vinyl-containing compound represented by Formula I:

Formula I

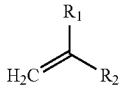

wherein at least one of $R_1$ and $R_2$ is and/or comprises an elastomeric moiety, as described herein.

The (=$CH_2$) group in Formula I represents a polymerizable group, and is, according to some embodiments, a UV-curable group, such that the flexible material is a UV-curable material.

For example, $R_1$ is or comprises an elastomeric moiety as defined herein and $R_2$ is, for example, hydrogen, C(1-4) alkyl, C(1-4) alkoxy, or any other substituent, as long as it does not interfere with the elastomeric properties of the cured material.

In some embodiments, $R_1$ is a carboxylate, and the compound is a mono-functional acrylate monomer. In some of these embodiments, $R_2$ is methyl, and the compound is mono-functional methacrylate monomer. Curable materials in which $R_1$ is carboxylate and $R_2$ is hydrogen or methyl are collectively referred to herein as "(meth)acrylates".

In some of any of these embodiments, the carboxylate group, —C(=O)—ORa, comprises Ra which is an elastomeric moiety as described herein.

In some embodiments, $R_1$ is amide, and the compound is a mono-functional acrylamide monomer. In some of these embodiments, $R_2$ is methyl, and the compound is mono-functional methacrylamide monomer. Curable materials in which $R_1$ is amide and $R_2$ is hydrogen or methyl are collectively referred to herein as "(meth)acrylamide".

(Meth)acrylates and (meth)acrylamides are collectively referred to herein as (meth)acrylic materials.

In some embodiments, $R_1$ is a cyclic amide, and in some embodiments, it is a cyclic amide such as lactam, and the compound is a vinyl lactam. In some embodiments, $R_1$ is a cyclic carboxylate such as lactone, and the compound is a vinyl lactone.

When one or both of $R_1$ and $R_2$ comprise a polymeric or oligomeric moiety, the mono-functional curable compound of Formula I is an exemplary polymeric or oligomeric mono-functional curable material. Otherwise, it is an exemplary monomeric mono-functional curable material.

In multi-functional elastomeric materials, the two or more polymerizable groups are linked to one another via an elastomeric moiety, as described herein.

In some embodiments, a multifunctional elastomeric material can be represented by Formula I as described herein, in which $R_1$ comprises an elastomeric material that terminates by a polymerizable group, as described herein.

For example, a di-functional elastomeric material can be represented by Formula I*:

Formula I*

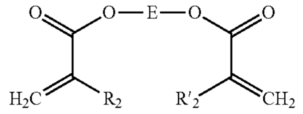

wherein E is an elastomeric linking moiety as described herein, and $R'_2$ is as defined herein for $R_2$.

In another example, a tri-functional elastomeric material can be represented by Formula II:

Formula II

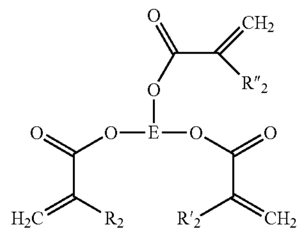

wherein E is an elastomeric linking moiety as described herein, and $R'_2$ and $R''_2$ are each independently as defined herein for $R_2$.

In some embodiments, a multi-functional (e.g., di-functional, tri-functional or higher) elastomeric material can be collectively represented by Formula III:

Formula III

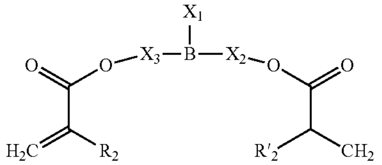

Wherein:

$R_2$ and $R'_2$ are as defined herein;

B is a di-functional or tri-functional branching unit as defined herein (depending on the nature of $X_1$);

$X_2$ and $X_3$ are each independently absent, an elastomeric moiety as described herein, or is selected from an alkyl, a hydrocarbon, an alkylene chain, a cycloalkyl, an aryl, an alkylene glycol, a urethane moiety, and any combination thereof; and $X_1$ is absent or is selected from an alkyl, a hydrocarbon, an alkylene chain, a cycloalkyl, an aryl, an alkylene glycol, a urethane moiety, and an elastomeric moiety, each being optionally being substituted (e.g., terminated) by a meth(acrylate) moiety ($O—C(═O)CR''_2═CH_2$), and any combination thereof, or, alternatively, $X_1$ is:

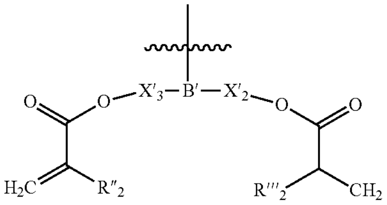

wherein: B' is a branching unit, being the same as, or different from, B;

$X'_2$ and $X'_3$ are each independently as defined herein for $X_2$ and $X_3$; and $R''_2$ and $R''_2$ are as defined herein for $R_2$ and $R'_2$.

Provided that at least one of $X_1$, $X_2$ and $X_3$ is or comprises an elastomeric moiety as described herein.

The term “branching unit” as used herein describes a multi-radical, preferably aliphatic or alicyclic group. By “multi-radical” it is meant that the linking moiety has two or more attachment points such that it links between two or more atoms and/or groups or moieties.

That is, the branching unit is a chemical moiety that, when attached to a single position, group or atom of a substance, creates two or more functional groups that are linked to this single position, group or atom, and thus “branches” a single functionality into two or more functionalities.

In some embodiments, the branching unit is derived from a chemical moiety that has two, three or more functional groups. In some embodiments, the branching unit is a branched alkyl or a branched linking moiety as described herein.

Multi-functional elastomeric materials featuring 4 or more polymerizable groups are also contemplated, and can feature structures similar to those presented in Formula III, while including, for example, a branching unit B with higher branching, or including an $X_1$ moiety featuring two (meth) acrylate moieties as defined herein, or similar to those presented in Formula II, while including, for example, another (meth)acrylate moiety that is attached to the elastomeric moiety.

In some embodiments, the elastomeric moiety, e.g., Ra in Formula I or the moiety denoted as E in Formulae I*, II and III, is or comprises an alkyl, which can be linear or branched, and which is preferably of 3 or more or of 4 or more carbon atoms; an alkylene chain, preferably of 3 or more or of 4 or more carbon atoms in length; an alkylene glycol as defined herein, an oligo(alkylene glycol), or a poly(alkylene glycol), as defined herein, preferably of 4 or more atoms in length, a urethane, an oligourethane, or a polyurethane, as defined herein, preferably of 4 or more carbon atoms in length, and any combination of the foregoing.

In some of any of the embodiments described herein, the elastomeric material is a (meth)acrylic curable material, as described herein, and in some embodiments, it is an acrylate.

In some of any of the embodiments described herein, the elastomeric material is or comprises a mono-functional elastomeric material, and is some embodiments, the mono-functional elastomeric material is represented by Formula I, wherein $R_1$ is —C(═O)—ORa and Ra is an alkylene chain (e.g., of 4 or more, preferably 6 or more, preferably 8 or more, carbon atoms in length), or a poly(alkylene glycol) chain, as defined herein.

In some embodiments, the elastomeric material is or comprises a multi-functional elastomeric material, and is some embodiments, the multi-functional elastomeric material is represented by Formula I*, wherein E is an alkylene chain (e.g., of 4 or more, or 6 or more, carbon atoms in length), and/or a poly(alkylene glycol) chain, as defined herein.

In some embodiments, the elastomeric material is or comprises a multi-functional elastomeric material, and is some embodiments, the multi-functional elastomeric material is represented by Formula II, wherein E is a branched alkyl (e.g., of 3 or more, or of 4 or more, or of 5 or more, carbon atoms in length).

In some of any of the embodiments described herein, the elastomeric material is an elastomeric acrylate or methacrylate (also referred to as acrylic or methacrylic elastomer), for example, of Formula I, I*, II or III, and in some embodiments, the acrylate or methacrylate is selected such that when hardened, the polymeric material features a Tg lower than 0° C. or lower than −10° C.

Exemplary elastomeric acrylate and methacrylate curable materials include, but are not limited to, 2-propenoic acid, 2-[[(butylamino)carbonyl]oxy]ethyl ester (an exemplary uretheane acrylate), and compounds marketed under the tradenames SR335 (Lauryl acrylate) and SR395 (isodecyl acrylate) (by Sartomer). Other examples include compounds marketed under the tradenames SR350D (a trifunctional trimethylolpropane trimethacrylate (TMPTMA), SR256 (2-(2-ethoxyethoxy)ethyl acrylate, SR252 (polyethylene glycol (600) dimethacrylate), SR561 (an alkoxylated hexane diol diacrylate) (by Sartomer).

In some of any of the embodiment described herein, the elastomeric material comprises one or more mono-functional elastomeric material(s) (e.g., a mono-functional elastomeric acrylate, as represented, for example, in Formula I) and one or more multi-functional (e.g., di-functional) elastomeric materials(s) (e.g., a di-functional elastomeric acrylate, as represented, for example, in Formula I*, II or III) and in any of the respective embodiments as described herein.

In some of any of the embodiments described herein, a total amount of the elastomeric material(s) is at least 40%, or at last 50%, or at least 60%, and can be up to 70% or even 80%, of the total weight of the elastomeric formulation comprising same.

In some of any of the embodiments described herein, the elastomeric formulation further comprises silica particles.

In some of any of the embodiments described herein, the silica particles have an average particle size lower than 1 micron, namely, the silica particles are sub-micron particles. In some embodiments, the silica particles are nanoparticles, having an average particle size in the range of from 0.1 nm to 900 nm, or from 0.1 nm to 700 nm, or from 1 nm to 700 nm, or from 1 nm to 500 nm or from 1 nm to 200 nm, including any intermediate value and subranges therebetween.

In some embodiments, at least a portion of such particles may aggregate, upon being introduced to the formulation. In some of these embodiments, the aggregate has an average size of no more than 3 microns, or no more than 1.5 micron.

Any commercially available formulations of sub-micron silica particles is usable in the context of the present embodiments, including fumed silica, colloidal silica, precipitated silica, layered silica (e.g., montmorillonite), and aerosol assisted self-assembly of silica particles.

The silica particles can be such that feature a hydrophobic or hydrophilic surface. The hydrophobic or hydrophilic nature of the particles' surface is determined by the nature of the surface groups on the particles.

When the silica is untreated, namely, is composed substantially of Si and O atoms, the particles typically feature silanol (Si—OH) surface groups and are therefore hydrophilic. Untreated (or uncoated) colloidal silica, fumed silica, precipitated silica and layered silica all feature a hydrophilic surface, and are considered hydrophilic silica.

Layered silica may be treated so as to feature long-chain hydrocarbons terminating by quaternary ammonium and/or ammonium as surface groups, and the nature of its surface is determined by the length of the hydrocarbon chains. Hydrophobic silica is a form of silica in which hydrophobic groups are bonded to the particles' surface, and is also referred to as treated silica or functionalized silica (silica reacted with hydrophobic groups).

Silica particles featuring hydrophobic surface groups such as, but not limited to, alkyls, preferably medium to high alkyls of 2 or more carbon atoms in length, preferably of 4 or more, or 6 or more, carbon atoms in length, cycloalkyls, aryl, and other hydrocarbons, as defined herein, or hydrophobic polymers (e.g., polydimethylsiloxane), are particles of hydrophobic silica.

Silica particles as described herein can therefore by untreated (non-functionalized) and as such are hydrophilic particles.

Alternatively, silica particles as described herein can be treated, or functionalized, by being reacted so as to form bonds with the moieties on their surface.

When the moieties are hydrophilic moieties, the functionalized silica particles are hydrophilic.

Silica particles featuring hydrophilic surface groups such as, but not limited to, hydroxy, amine, ammonium, carboxy, silanol, oxo, and the like, are particles of hydrophilic silica.

When the moieties are hydrophobic moieties, as described herein, the functionalized silica particles are hydrophobic.

In some of any of the embodiments described herein, at least a portion, or all, of the silica particles feature a hydrophillic surface (namely, are hydrophillic silica particles, for example, of untreated silica such as colloidal silica).

In some of any of the embodiments described herein, at least a portion, or all, of the silica particles feature a hydrophobic surface (namely, are hydrophobic silica particles).

In some embodiments, the hydrophobic silica particles are functionalized silica particles, namely, particles of silica treated with one or more hydrophobic moieties.

In some of any of the embodiments described herein, at least a portion, or all, of the silica particles are hydrophobic silica particles, functionalized by curable functional groups (particles featuring curable groups on their surface).

The curable functional groups can be any polymerizable group as described herein. In some embodiments, the curable functional groups are polymerizable by the same polymerization reaction as the curable monomers in the formulation, and/or when exposed to the same curing condition as the curable monomers. In some embodiments, the curable groups are (meth)acrylic (acrylic or methacrylic) groups, as defined herein.

Hydrophilic and hydrophobic, functionalized and untreated silica particles as described herein can be commercially available materials or can be prepared using methods well known in the art.

By "at least a portion", as used in the context of these embodiments, it is meant at least 10%, or at least 20%, or at least 30%, or at least 40%, or at least 50%, or at least 60%, or at least 70%, or at least 80%, or at least 90%, or at least 95%, or at least 98%, of the particles.

The silica particles may also be a mixture of two or more types of silica particles, for example, two or more types of any of the silica particles described herein.

In some of any of the embodiments described herein, an amount of the silica particles in a modeling material formulation comprising same ranges from about 1% to about 20%, or from about 1% to about 15%, or from about 1% to about 10%, by weight, of the total weight of the elastomeric formulation.

The amount of the silica particles can be manipulated as desired so as to control the mechanical properties of the cured material. For example, higher amount of silica particles may result in higher elastic modulus of the cured sacrificial structure.

In some of any of the embodiments described herein, an amount of the silica particles is such that a weight ratio of the elastomeric material(s) and the silica particles in the elastomeric formulation ranges from about 50:1 to about 4:1 or from about 30:1 to about 4:1 or from about 20:1 to about 2:1, including any intermediate values and subranges therebetween.

According to some of any of the embodiments described herein, the elastomeric formulation further comprises one or more additional curable material(s).

The additional curable material can be a mono-functional curable material, a multi-functional curable material, or a mixture thereof, and each material can be a monomer, an oligomer or a polymer, or a combination thereof.

Preferably, but not obligatory, the additional curable material is polymerizable when exposed to the same curing energy at which the curable elastomeric material is polymerizable, for example, upon exposure to irradiation (e.g., UV-vis irradiation).

In some embodiments, the additional curable material is such that when hardened, the polymerized material features Tg higher than that of an elastomeric material, for example, a Tg higher than 0° C., or higher than 5° C. or higher than 10° C.

Herein throughout, "Tg" refers to glass transition temperature defined as the location of the local maximum of the E" curve, where E" is the loss modulus of the material as a function of the temperature.

Broadly speaking, as the temperature is raised within a range of temperatures containing the Tg temperature, the state of a material, particularly a polymeric material, gradually changes from a glassy state into a rubbery state.

Herein, "Tg range" is a temperature range at which the E" value is at least half its value (e.g., can be up to its value) at the Tg temperature as defined above.

Without wishing to be bound to any particular theory, it is assumed that the state of a polymeric material gradually changes from the glassy state into the rubbery within the Tg range as defined above. Herein, the term "Tg" refers to any temperature within the Tg range as defined herein.

In some embodiments, the additional curable material is a mono-functional acrylate or methacrylate ((meth)acrylate). Non-limiting examples include isobornyl acrylate (IBOA), isobornylmethacrylate, acryloyl morpholine (ACMO), phenoxyethyl acrylate, marketed by Sartomer Company (USA) under the trade name SR-339, urethane acrylate oligomer such as marketed under the name CN 131B, and any other acrylates and methacrylates usable in AM methodologies.

In some embodiments, the additional curable material is a multi-functional acrylate or methacrylate ((meth)acrylate). Non-limiting examples of multi-functional (meth)acrylates include propoxylated (2) neopentyl glycol diacrylate, marketed by Sartomer Company (USA) under the trade name SR-9003, Ditrimethylolpropane Tetra-acrylate (DiTMPTTA), Pentaerythitol Tetra-acrylate (TETTA), and Dipentaerythitol Penta-acrylate (DiPEP), and an aliphatic urethane diacrylate, for example, such as marketed as Ebecryl 230. Non-limiting examples of multi-functional (meth) acrylate oligomers include ethoxylated or methoxylated polyethylene glycol diacrylate or dimethacrylate, ethoxylated bisphenol A diacrylate, polyethylene glycol-polyethylene glycol urethane diacrylate, a partially acrylated polyol oligomer, polyester-based urethane diacrylates such as marketed as CNN91.

Any other curable material, preferably a curable material featuring, when hardened, a Tg as defined herein, is contemplated.

In some of any of the embodiments described herein, the elastomeric formulation further comprises an initiator, for initiating polymerization of the curable materials.

When all curable materials (elastomeric and additional, if present) are photopolymerizable, a photoinitiator is usable in these embodiments.

Non-limiting examples of suitable photoinitiators include benzophenones (aromatic ketones) such as benzophenone, methyl benzophenone, Michler's ketone and xanthones; acylphosphine oxide type photo-initiators such as 2,4,6-trimethylbenzolydiphenyl phosphine oxide (TMPO), 2,4,6-trimethylbenzoylethoxyphenyl phosphine oxide (TEPO), and bisacylphosphine oxides (BAPO's); benzoins and bezoin alkyl ethers such as benzoin, benzoin methyl ether and benzoin isopropyl ether and the like. Examples of photoinitiators are alpha-amino ketone, bisacylphosphine oxide (BAPO's), and those marketed under the tradename Irgacure®.

A photo-initiator may be used alone or in combination with a co-initiator. Benzophenone is an example of a photoinitiator that requires a second molecule, such as an amine, to produce a free radical. After absorbing radiation, benzophenone reacts with a ternary amine by hydrogen abstraction, to generate an alpha-amino radical which initiates polymerization of acrylates. Non-limiting example of a class of co-initiators are alkanolamines such as triethylamine, methyldiethanolamine and triethanolamine.

A concentration of a photoinitiator in a formulation containing same may range from about 0.1 to about 5 weight percents, or from about 1 to about 5 weight percents, including any intermediate value and subranges therebetween.

According to some of any of the embodiments described herein, the elastomeric formulation further comprises one or more additional, non-curable material, for example, one or more of a colorant, a dispersant, a surfactant, a stabilizer and an inhibitor.

An inhibitor is included in the formulation(s) for preventing or slowing down polymerization and/or curing prior to exposing to the curing condition. Commonly used inhibitors, such as radical inhibitors, are contemplated.

Commonly used surfactants, dispersants, colorants and stabilizers are contemplated. Exemplary concentrations of each component, if present, range from about 0.01 to about 1, or from about 0.01 to about 0.5, or from about 0.01 to about 0.1, weight percents, of the total weight of the formulation containing same.

In some of any of the embodiments described herein, the elastomeric material is a UV curable material, and in some embodiments, it is an elastomeric (meth)acrylate, for example, an elastomeric acrylate.

In some of any of the embodiments described herein, an additional curable component is included in the elastomeric formulation, and in some embodiments, this component is a UV-curable acrylate or methacrylate.

In some of any of the embodiments described herein, the silica particles are (meth)acrylate-functionalized silica particles.

In some of any of the embodiments described herein, the elastomeric formulation comprises one or more mono-functional elastomeric acrylate, one or more multi-functional elastomeric acrylate, one or more mono-functional acrylate or methacrylate and one or more multi-functional acrylate or methacrylate.

In some of these embodiments, the elastomeric formulation further comprises one or more photoinitiators, for example, of the Igracure® family.

In some of any of the embodiments described herein, all curable materials and the silica particles are included in a single formulation.

In some embodiments, silica particles, one or more photointiators, and optionally other components, are included in the elastomeric formulation.

In exemplary formulations according to some of any of the embodiments described herein, all curable materials are (meth)acrylates.

In any of the exemplary formulations described herein, a concentration of a photoinitiator ranges from about 1% to about 5% by weight, or from about 2% to about 5%, or from about 3% to about 5%, or from about 3% to about 4% (e.g., 3, 3.1, 3.2, 3.25, 3.3, 3.4, 3.5, 3.6, 3.7, 3.8, 3.85, 3.9, including any intermediate value therebetween) %, by weight, of the total weight of a formulation comprising same.

In any of the exemplary formulations described herein, a concentration of an inhibitor ranges from 0 to about 2% weight, or from 0 to about 1%, and is, for example, 0, 0.1, 0.2, 0.3, 0.4, 0.5, 0.6, 0.7, 0.8, 0.9 or about 1%, by weight, including any intermediate value therebetween, of the total weight of a formulation comprising same.

In any of the exemplary formulations described herein, a concentration of a surfactant ranges from 0 to about 1% weight, and is, for example, 0, 0.01, 0.05, 0.1, 0.5 or about 1%, by weight, including any intermediate value therebetween, of the total weight of a formulation comprising same.

In any of the exemplary formulations described herein, a concentration of a dispersant ranges from 0 to about 2% weight, and is, for example, 0, 0.1, 0.5, 0.7, 1, 1.2, 1.3, 1.35, 1.4, 1.5, 1.7, 1.8 or about 2%, by weight, including any intermediate value therebetween, of the total weight of a formulation comprising same.

In exemplary formulations according to some of any of the embodiments described herein, a concentration of an elastomeric material ranges from about 30% to about 90% by weight, or from about 40% to about 90%, by weight, or from about 40% to about 85%, by weight.

In some embodiments, the elastomeric material comprises a mono-functional elastomeric material and a multi-functional elastomeric material.

In some embodiments, a concentration of the mono-functional elastomeric material ranges from about 20% to about 70%, or from about 30% to about 50%, by weight, including any intermediate value and subranges therebetween. In exemplary embodiments, a concentration of the mono-functional elastomeric material ranges from about 50% to about 70%, or from about 55% to about 65%, or from about 55% to about 60% (e.g. 58%), by weight, including any intermediate value and subranges therebetween. In exemplary embodiments, a concentration of the mono-functional elastomeric material ranges from about 30% to about 50%, or from about 35% to about 50%, or from about 40% to about 45% (e.g., 42%), by weight, including any intermediate value and subranges therebetween.

In some embodiments, a concentration of the multi-functional elastomeric material ranges from about 10% to about 30%, by weight. In exemplary embodiments, a concentration of the mono-functional elastomeric material ranges from about 10% to about 20%, or from about 10% to about 15% (e.g. 12%), by weight. In exemplary embodiments, a concentration of the mono-functional elastomeric material ranges from about 10% to about 30%, or from about 10% to about 20%, or from about 15% to about 20% (e.g., 16%), by weight.

In exemplary formulations according to some of any of the embodiments described herein, a total concentration of an additional curable material ranges from about 10% to about 40% by weight, or from about 15% to about 35%, by weight, including any intermediate value and subranges therebetween.

In some embodiments, the additional curable material comprises a mono-functional curable material.

In some embodiments, a concentration of the mono-functional additional curable material ranges from about 15% to about 25%, or from about 20% to about 25% (e.g., 21%), by weight, including any intermediate value and subranges therebetween. In exemplary embodiments, a concentration of the mono-functional elastomeric material ranges from about 20% to about 30%, or from about 25% to about 30% (e.g., 28%), by weight, including any intermediate value and subranges therebetween.

In exemplary formulations according to some of any of the embodiments described herein, the elastomeric material comprises a mono-functional elastomeric material and a multi-functional elastomeric material; a concentration of the mono-functional elastomeric material ranges from about 30% to about 50% (e.g., from about 40% to about 45%) or from about 50% to about 70% (e.g., from about 55% to about 60%) by weight; and a concentration of the multi-functional elastomeric material ranges from about 10% to about 20% by weight; and the one or more formulation(s) further comprise(s) an additional mono-functional curable material at a total concentration that ranges from about 20% to about 30%, by weight.

According to some of any of the embodiments described herein, the elastomeric formulation comprises at least one elastomeric mono-functional curable material, at least one elastomeric multi-functional curable material and at least additional mono-functional curable material.

According to some of any of the embodiments described herein, a concentration of the curable mono-functional material ranges from 10% to 30%, by weight of the total weight of the elastomeric formulation.

According to some of any of the embodiments described herein, a concentration of the elastomeric mono-functional curable material ranges from 50% to 70%, by weight, of the total weight of the elastomeric formulation According to some of any of the embodiments described herein, a concentration of the elastomeric multi-functional curable material ranges from 10% to 20%, by weight, of the total weight of the elastomeric formulation According to some of any of the embodiments described herein, a concentration of the curable mono-functional material ranges from 10% to 30%, by weight; a concentration of the elastomeric mono-functional curable material ranges from 50% to 70%, by weight; and a concentration of the elastomeric multi-functional curable material ranges from 10% to 20%, by weight, of the total weight of the elastomeric formulation.

According to some of any of the embodiments described herein, a concentration of the curable mono-functional material ranges from 20% to 30%, by weight, of the total weight of the elastomeric formulation.

According to some of any of the embodiments described herein, a concentration of the elastomeric mono-functional curable material ranges from 30% to 50%, by weight, of the total weight of the elastomeric formulation.

According to some of any of the embodiments described herein, a concentration of the elastomeric multi-functional curable material ranges from 10% to 30%, by weight, of the total weight of the elastomeric formulation.

According to some of any of the embodiments described herein, a concentration of the curable mono-functional material ranges from 20% to 30%, by weight; a concentration of the elastomeric mono-functional curable material ranges from 30% to 50%, by weight; and a concentration of the elastomeric multi-functional curable material ranges from 10% to 30%, by weight, of the total weight of the elastomeric formulation.

In some embodiments, an elastomeric formulation as described herein, is characterized, when hardened, by Tear strength of at least 4,000 N/m, or at least 4500 N/m or at least 5,000 N/m.

In some embodiments, an elastomeric formulation as described herein, is characterized, when hardened, by Tear strength higher by at least 500 N/m, or by at least 700 N/m, or by at least 800 N/m, than that of the formulation devoid of said silica particles, when hardened.

In some embodiments, an elastomeric formulation as described herein, is characterized, when hardened, by Tensile Strength of at least 2 MPa.

In some of any of the embodiments described herein there is provided a kit comprising the elastomeric formulation, as described herein in any of the respective embodiments and any combination thereof.

Herein throughout, the phrases “rubber”, “rubbery materials”, “elastomeric materials” and “elastomers” are used interchangeably to describe materials featuring characteristics of elastomers. The phrase "rubbery-like material" or "rubber-like material" is used to describe materials featuring characteristics of rubbers, prepared by additive manufacturing (e.g., 3D inkjet printing) rather than conventional processes that involve vulcanization of thermoplastic polymers.

The term "rubbery-like material" is also referred to herein interchangeably as "elastomeric material".

Elastomers, or rubbers, are flexible materials that are characterized by low Tg (e.g., lower than room temperature, preferably lower than 10° C., lower than 0° C. and even lower than −10° C.).

The following describes some of the properties characterizing rubbery (elastomeric) materials, as used herein and in the art.

Shore A Hardness, which is also referred to as Shore hardness or simply as hardness, describes a material's resistance to permanent indentation, defined by type A durometer scale. Shore hardness is typically determined according to ASTM D2240.

Elastic Modulus, which is also referred to as Modulus of Elasticity or as Young's Modulus, or as Tensile modulus, or "E", describes a material's resistance to elastic deformation when a force is applied, or, in other words, as the tendency of an object to deform along an axis when opposing forces are applied along that axis. Elastic modulus is typically measured by a tensile test (e.g., according to ASTM D 624) and is determined by the linear slope of a Stress-Strain curve in the elastic deformation region, wherein Stress is the force causing the deformation divided by the area to which the force is applied and strain is the ratio of the change in some length parameter caused by the deformation to the original value of the length parameter. The stress is proportional to the tensile force on the material and the strain is proportional to its length.

Tensile Strength describes a material's resistance to tension, or, in other words, its capacity to withstand loads tending to elongate, and is defined as the maximum stress in MPa, applied during stretching of an elastomeric composite before its rupture. Tensile strength is typically measured by a tensile test (e.g., according to ASTM D 624) and is determined as the highest point of a Stress-Strain curve, as described herein and in the art.

Elongation is the extension of a uniform section of a material, expressed as percent of the original length, and is typically determined according to ASTM D412.

Z Tensile elongation is the elongation measured as described herein upon printing in Z direction.

Tear resistance describes the maximum force required to tear a material, expressed in units of force per unit length, whereby the force acts substantially parallel to the major axis of the sample. Tear resistance can be measured by the ASTM D 412 method. ASTM D 624 can be used to measure the resistance to the formation of a tear (tear initiation) and the resistance to the expansion of a tear (tear propagation). Typically, a sample is held between two holders and a uniform pulling force is applied until deformation occurs. Tear strength is then calculated by dividing the force applied by the thickness of the material.

Tear resistance under constant elongation describes the time required for a specimen to tear when subjected to constant elongation (lower than elongation at break).

Herein throughout, the phrases "building material formulation", "uncured building material", "uncured building material formulation", "building material" and other variations therefore, collectively describe the materials that are dispensed to sequentially form the layers, as described herein. This phrase encompasses uncured materials dispensed so as to form the object, namely, one or more uncured modeling material formulation(s), and uncured materials dispensed so as to form the support, namely uncured support material formulations.

Herein throughout, the phrase "cured modeling material" or "hardened modeling material" describes the part of the building material that forms the object, as defined herein, upon exposing the dispensed building material to curing, and, optionally, if a support material has been dispensed, also upon removal of the cured support material, as described herein. The cured modeling material can be a single cured material or a mixture of two or more cured materials, depending on the modeling material formulations used in the method, as described herein.

The phrase "cured modeling material" or "cured modeling material formulation" can be regarded as a cured building material wherein the building material consists only of a modeling material formulation (and not of a support material formulation). That is, this phrase refers to the portion of the building material, which is used to provide the final object.

Herein throughout, the phrase "modeling material formulation", which is also referred to herein interchangeably as "modeling formulation", "model formulation" "model material formulation" or simply as "formulation", describes a part or all of the building material which is dispensed so as to form the object, as described herein. The modeling material formulation is an uncured modeling formulation (unless specifically indicated otherwise), which, upon exposure to curing energy, forms the object or a part thereof.

In some embodiments of the present invention, a modeling material formulation is formulated for use in three-dimensional inkjet printing and is able to form a three-dimensional object on its own, i.e., without having to be mixed or combined with any other substance.

An uncured building material can comprise one or more modeling formulations, and can be dispensed such that different parts of the object are made, upon curing, of different cured modeling formulations or different combinations thereof, and hence are made of different cured modeling materials or different mixtures of cured modeling materials.

The formulations forming the building material (modeling material formulations and support material formulations) comprise one or more curable materials, which, when exposed to curing energy, form hardened (cured) material.

Herein throughout, a "curable material" is a compound (typically a monomeric or oligomeric compound, yet optionally a polymeric material) which, when exposed to curing energy, as described herein, solidifies or hardens to form a cured material. Curable materials are typically polymerizable materials, which undergo polymerization and/or cross-linking when exposed to suitable energy source.

The polymerization can be, for example, free-radical polymerization, cationic polymerization or anionic polymerization, and each can be induced when exposed to curing energy such as, for example, radiation, heat, etc., as described herein.

In some of any of the embodiments described herein, a curable material is a photopolymerizable material, which polymerizes and/or undergoes cross-linking upon exposure to radiation, as described herein, and in some embodiments the curable material is a UV-curable material, which polymerizes and/or undergoes cross-linking upon exposure to UV radiation, as described herein.

In some embodiments, a curable material as described herein is a photopolymerizable material that polymerizes via photo-induced free-radical polymerization. Alternatively, the curable material is a photopolymerizable material that polymerizes via photo-induced cationic polymerization.

In some of any of the embodiments described herein, a curable material can be a monomer, an oligomer or a short-chain polymer, each being polymerizable and/or cross-linkable as described herein.

In some of any of the embodiments described herein, when a curable material is exposed to curing energy (e.g., radiation), it hardens (cured) by any one, or combination, of chain elongation and cross-linking.

In some of any of the embodiments described herein, a curable material is a monomer or a mixture of monomers which can form a polymeric material upon a polymerization reaction, when exposed to curing energy at which the polymerization reaction occurs. Such curable materials are also referred to herein as monomeric curable materials.

In some of any of the embodiments described herein, a curable material is an oligomer or a mixture of oligomers which can form a polymeric material upon a polymerization reaction, when exposed to curing energy at which the polymerization reaction occurs. Such curable materials are also referred to herein as oligomeric curable materials.

In some of any of the embodiments described herein, a curable material, whether monomeric or oligomeric, can be a mono-functional curable material or a multi-functional curable material.

Herein, a mono-functional curable material comprises one functional group that can undergo polymerization when exposed to curing energy (e.g., radiation).

A multi-functional curable material comprises two or more, e.g., 2, 3, 4 or more, functional groups that can undergo polymerization when exposed to curing energy. Multi-functional curable materials can be, for example, di-functional, tri-functional or tetra-functional curable materials, which comprise 2, 3 or 4 groups that can undergo polymerization, respectively. The two or more functional groups in a multi-functional curable material are typically linked to one another by a linking moiety, as defined herein. When the linking moiety is an oligomeric or polymeric moiety, the multi-functional group is an oligomeric or polymeric multi-functional curable material. Multi-functional curable materials can undergo polymerization when subjected to curing energy and/or act as cross-linkers.

According to some embodiments of the invention, a thickness of the intermediate structure is from about 100 microns to about 300 microns, more preferably from about 210 microns to about 290 microns, more preferably from about 220 microns to about 280 microns, e.g., about 250 microns.

According to some embodiments of the invention, the sacrificial structure is characterized, once solidified, by a tear resistance of at least 4 kN per meter, when measured according to international standard ASTM D-624, once solidified.

According to some embodiments of the invention, the sacrificial structure is characterized, once solidified, by a tear resistance of from about 4 kN per meter to about 8 kN per meter, more preferably from about 5 kN per meter to about 7 kN per meter, when measured according to international standard ASTM D-624.

According to some embodiments of the invention, a magnitude of the peeling force is from about 1 N to about 20 N, e.g., about 10 N.

According to some embodiments of the invention, a thickness of the sacrificial structure is selected such that a peeling force of about 5 N results in a bending strain of at least 0.02, more preferably at least 0.022, more preferably 0.024, more preferably 0.026.

According to some embodiments of the invention, a magnitude of the peeling force is from about 1 N to about 10 N, e.g., about 5 N.

According to some embodiments of the invention, a minimal thickness of the sacrificial structure is from about 500 microns to about 3 mm, more preferably from about 500 microns to about 2.5 mm, more preferably from about 500 microns to about 2 mm.

According to some embodiments of the invention, for at least one of the stack of model layers and the layered sacrificial structure, a flexural modulus of the modeling material is from about 2000 MPa to about 4000 MPa, more preferably from about 2000 MPa to about 3500 MPa, from about 2200 MPa to about 3200 MPa, when measured according to international standard ASTM D-790-04.

According to some embodiments of the invention, the flexible material is selected from mono-functional elastomeric monomer, mono-functional elastomeric oligomer, multi-functional elastomeric monomer, multi-functional elastomeric oligomer, and any combination thereof.

According to some embodiments of the invention, the formulation further comprises at least one additional curable material.

According to some embodiments of the invention, the additional curable material is selected from a mono-functional curable monomer, a mono-functional curable oligomer, a multi-functional curable monomer, a multi-functional curable oligomer and any combination thereof.

According to some embodiments of the invention, the at least one modeling material formulation further comprises at least one additional, non-curable material, for example, one or more of a colorant, an initiator, a dispersant, a surfactant, a stabilizer and an inhibitor.

According to some embodiments of the invention, the flexible material is a UV-curable elastomeric material.

According to some embodiments of the invention, the flexible material is an acrylic elastomer.

According to some embodiments of the invention, the formulation is characterized, when hardened, by a tear resistance which is higher by at least 0.5 kN per meter than, a solidified formulation having the same elastomeric material but devoid of the silica particles.

According to some embodiments of the invention, the formulation comprises at least one elastomeric mono-functional curable material, at least one elastomeric multi-functional curable material and at least additional mono-functional curable material.

According to some embodiments of the invention, a total concentration of the curable mono-functional material ranges from 10% to 30%, by weight of the total weight of the formulation.

According to some embodiments of the invention, a total concentration of the elastomeric mono-functional curable material ranges from 50% to 70%, by weight of the total weight of the formulation.

According to some embodiments of the invention, a total concentration of the elastomeric multi-functional curable material ranges from 10% to 20%, by weight, of the total weight of the formulation.

According to some embodiments of the invention, a total concentration of the curable mono-functional material ranges from 10% to 30%, by weight; a total concentration of the elastomeric mono-functional curable material ranges from 50% to 70%, by weight; and a total concentration of the elastomeric multi-functional curable material ranges from 10% to 20%, by weight, of the total weight of the formulation.

According to some embodiments of the invention, a total concentration of the curable mono-functional material ranges from 20% to 30%, by weight, of the total weight of the formulation.

According to some embodiments of the invention, a total concentration of the elastomeric mono-functional curable material ranges from 30% to 50%, by weight, of the total weight of the formulation.

According to some embodiments of the invention, a total concentration of the elastomeric multi-functional curable material ranges from 10% to 30%, by weight, of the total weight of the formulation.

According to some embodiments of the invention, a total concentration of the curable mono-functional material ranges from 20% to 30%, by weight; a total concentration of the elastomeric mono-functional curable material ranges from 30% to 50%, by weight; and a total concentration of the elastomeric multi-functional curable material ranges from 10% to 30%, by weight, of the total weight of the formulation.

It is expected that during the life of a patent maturing from this application many relevant building materials for AM will be developed and the scope of the term modeling material and support material is intended to include all such new technologies a priori.

The colors of the different materials referred to herein are denoted as follows: Cyan (C), Magenta (M), Yellow (Y), White (W), Black (K). Support material may be denoted as (S). Clear/transparent material may be denoted as (T). A plurality of materials may be referred to in a series as, e.g. CMY, CMYWKS and so on.

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

As used herein the term "about" refers to ±10%.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated herein above and as claimed in the claims section below find experimental support in the following examples.

EXAMPLES

Reference is now made to the following examples, which together with the above descriptions illustrate some embodiments of the invention in a non-limiting fashion.

Example 1

Proof of Concept

Experiments were made to determine parameters suitable for ensuring removal of the sacrificial structure by peeling.

One manufactured object was a full-colored owl statuette. FIGS. 14A, 14B, 14C and 14D are images showing the peeling process of a flexible sacrificial structure off the colored owl statuette. The sacrificial structure was formed from flexible black material. Optionally the flexible sacrificial structure may be formed with a thin separation layer of soft material between it and the object being formed.

Example 2

Shore a Experiments

In some embodiments of the present invention, when the black modeling material is replaced with a black flexible material so that a peelable sacrificial structure can be formed, regions of the object comprising a substantial amount of flexible black material may have reduced physical properties, such as a significant decrease in their Shore A value. To solve this issue, two main options are envisioned:

(1) printing black regions with a digital combination of color modeling material (CMY) to obtain a black color and avoid variations in the physical properties; or (2) combine the black flexible material with a proportion of color CMY material so that no decrease in the physical properties is observed. While option (1) may be appropriate in some cases, it also presents some drawbacks as "true black" color is difficult to obtain with a mixture of CMY colors alone and consumption of CMY modeling materials would increase. As to the second option, experiments were made to determine the minimal content of modeling material(s) needed in combination with a flexible material to avoid a decrease in the Shore A value.

Figure 15:
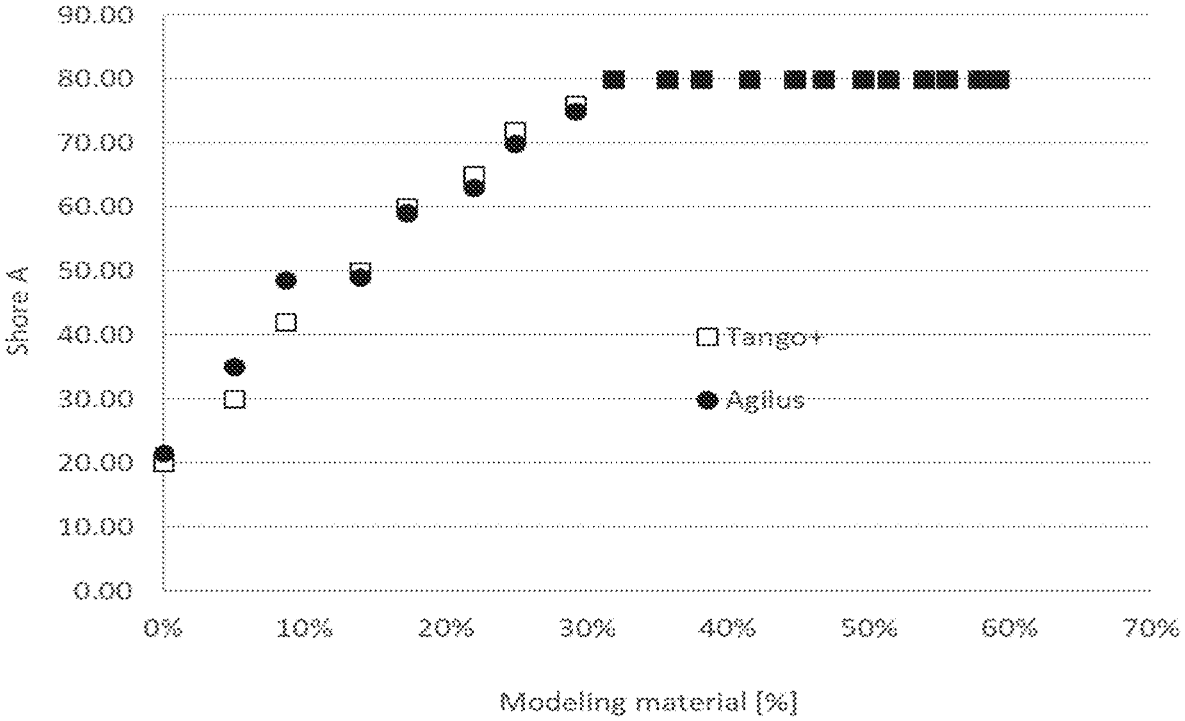
FIG. 15 is a graph showing Shore A values of various black samples printed with different combinations of modeling/flexible materials, according to some embodiments of the invention.

Shore A values were measured with a Shore hardness tester Zwick 3110 . . . 13 (Zwick/Roell, Germany) following standard test method ASTM D2240 on 20*20*7 mm black samples printed on a J750 PolyJet™ printer (Stratasys® Ltd., Israel). Various digital combinations were tested, using modeling materials from the Vero™ family (Stratasys® Ltd., Israel) and a flexible black material selected from TangoBlackPlus™ FLX 980 (Stratasys® Ltd., Israel) and Agilus30™ Black FLX985 (Stratasys® Ltd., Israel). Drops of flexible material were randomly deposited when printing the samples to obtain homogeneous structures. The results obtained are shown in FIG. 15 and in Table 1 below.

TABLE 1

| Modeling [%] | Agilus [%] | Shore A | Tango+ [%] | Shore A |
|---|---|---|---|---|
| 0 | 100 | 21 | 100 | 20 |
| 5 | 95 | 35 | 95 | 30 |
| 9 | 91 | 48 | 91 | 42 |
| 14 | 86 | 49 | 86 | 50 |
| 17 | 83 | 59 | 83 | 60 |
| 22 | 78 | 63 | 78 | 65 |
| 25 | 75 | 70 | 75 | 72 |
| 29 | 71 | 75 | 71 | 76 |
| 32 | 68 | 80 | 68 | 80 |
| 36 | 64 | 80 | 64 | 80 |
| 38 | 62 | 80 | 62 | 80 |
| 42 | 58 | 80 | 58 | 80 |
| 45 | 55 | 80 | 55 | 80 |
| 47 | 53 | 80 | 53 | 80 |
| 50 | 50 | 80 | 50 | 80 |
| 59 | 41 | 80 | 41 | 80 |
| 100 | 0 | 80 | 0 | 80 |

The above experiments show that if the samples comprise at least about 30% of modeling material in combination with a flexible material (at most 70%) randomly distributed among the structure of the sample, than the Shore A value of the samples is similar to the Shore A value measured for samples comprising 100% modeling material, and no change in the physical properties is observed.

Example 3

Stickiness Experiments

In some embodiments of the present invention, when the black modeling material is replaced with a black flexible material so that a peelable sacrificial structure can be formed, regions of the object comprising a large proportion of black color tend to be sticky due to the chemical composition of the flexible material. To solve the "stickiness" issue, two main options were envisioned: (1) printing the black regions with a combination of color modeling material (CMY) to digitally mimic the black color and avoid a stickiness effect; or (2) combine the black flexible material with a proportion of color CMY material until almost no stickiness is observed. While option (1) may be appropriate in some cases, it also presents some drawbacks as "true black" color is difficult to create with a mixture of CMY colors alone and consumption of CMY modeling materials would be increased. As to the second option, experiments were made to determine the minimal content of modeling material(s) needed in combination with a flexible material to render the stickiness effect negligible.

Figure 16:
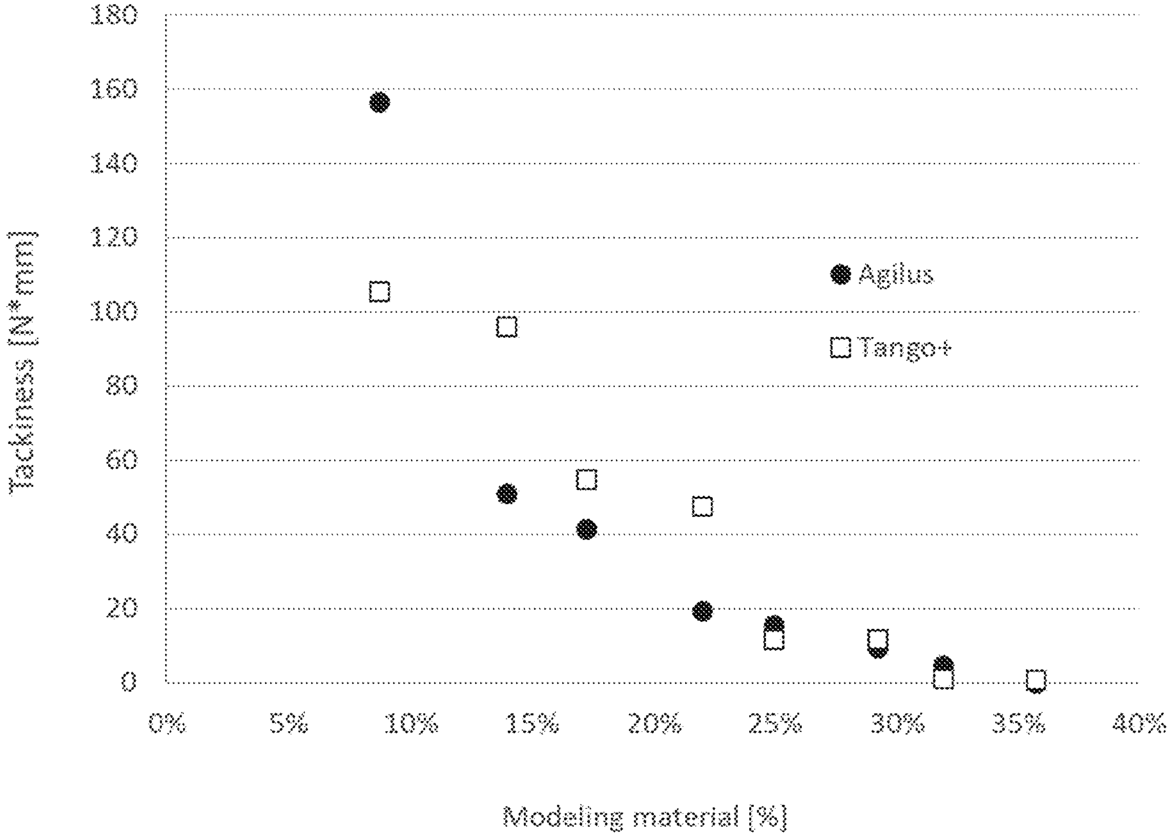
FIG. 16 is a graph showing Tackiness values of various black samples printed with different combinations of modeling/flexible materials, according to some embodiments of the invention.

Stickiness values were measured with a LR30K Lloyd Instruments apparatus (Ametek, USA). A round probe was brought into contact with 60*60*6 mm black samples printed on a J750 PolyJet™ printer (Stratasys® Ltd, Israel) and a force of about 400N was applied. The probe was slowly pulled back from the sample while measuring the force values over time. Areas below the curves were integrated to obtain a "stickiness" value in N*mm. Various digital combinations were tested, using modeling materials from the Vero™ family (Stratasys® Ltd., Israel) and a flexible black material selected from TangoBlackPlus™ FLX 980 (Stratasys® Ltd., Israel) and Agilus30™ Black FLX985 (Stratasys® Ltd., Israel). Drops of flexible material were randomly deposited when printing the samples to obtain homogeneous structures. The results obtained are shown in FIG. 16 and in Table 2 below.

TABLE 2

| Modeling [%] | Agilus [%] | Stickiness (N*mm) | Tango+ [%] | Stickiness (N*mm) |
|---|---|---|---|---|
| 9 | 91 | 156 | 91 | 105 |
| 14 | 86 | 51 | 86 | 96 |
| 17 | 83 | 41 | 83 | 55 |
| 22 | 78 | 19 | 78 | 47 |
| 25 | 75 | 15 | 75 | 11 |
| 29 | 71 | 9 | 71 | 11 |
| 32 | 68 | 5 | 68 | 1 |
| 36 | 64 | 0 | 64 | 1 |

The above experiments show that if the samples comprise at least about 30% of modeling material in combination with a flexible material (at most 70%) randomly distributed among the structure of the sample, then the stickiness effect is negligible.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. An additive manufacturing (AM) system for fabricating a three-dimensional colored object, the system comprising:

a set of supply cartridges with different colored model materials, a cartridge containing a flexible material, and a cartridge containing a soft material, the soft material having an elastic modulus less than the flexible material;

nozzle arrays mounted in dispensing heads configured to receive materials from the supply cartridges;

a solidification system configured for solidifying the materials dispensed from the dispensing heads; and a computerized controller having a circuit configured for operating the dispensing heads and the solidification system to sequentially dispense and solidify a plurality of layers comprising (i) a plurality of different colored model materials received from said set of supply cartridges and arranged in a configured pattern corresponding to a shape and a color definition of the object, (ii) the flexible material arranged in a configured pattern to form a sacrificial structure at least partially encompassing the object, and (iii) the soft material arranged in a configured pattern to provide an intermediate structure between at least one model material of said plurality of different colored model materials and the sacrificial structure;

wherein the flexible material is black and said circuit is configured to ensure that said nozzle arrays form a first black region of the object by an amount of said black flexible material, and a second black region of the object by digitally mixing the plurality of different colored model materials to create a black color.

2. The AM system of claim 1, wherein the plurality of different color model materials does not include black model material.

3. AM system of claim 1, wherein said second black color region has a volume that is larger than a defined threshold, and said first black color region has a volume that is smaller or equal said defined threshold.

4. The AM system of claim 1, wherein the soft material is arranged in a configured pattern to form divisions in the sacrificial structure.

5. The AM system according to claim 4, wherein the divisions are formed on symmetrical planes to the object.

6. The AM system of claim 1, wherein the soft material is arranged in a configured pattern to fill holes defined by geometry of the object.

7. The AM system of claim 6, wherein the soft material is arranged in a configured pattern to form divisions in the sacrificial structure.

8. The AM system of claim 1, wherein the soft material is configured to encompass breakable features.

9. The AM system of claim 1, wherein there are up to six supply cartridges in the set of supply cartridges.

10. The AM system of claim 1, comprising up to three dispensing heads.

11. The AM system of claim 10, wherein there are up to six supply cartridges in the set of supply cartridges.

12. The AM system of claim 1, wherein a thickness of the intermediate structure between the model material and the sacrificial structure provided by the soft material is 100 microns to 300 microns.

13. The AM system of claim 1, wherein a thickness of the sacrificial structure is from about 500 microns to about 3 mm.

14. The AM system of claim 1, wherein a of the soft material is from about 1 to about 50 voxels.

15. The AM system of claim 1, wherein a of the soft material is from about 10 to about 500 microns.

16. The AM system of claim 1, wherein a thickness of the sacrificial structure is selected such that a peeling force of about 5 N results in a bending strain of at least 0.02.

17. The AM system of claim 1, wherein the sacrificial structure is characterized, once solidified, by a tear resistance of from about 4 kN per meter to about 8 kN per meter, when measured according to international standard ASTM D-624.

* * * * *